(12) United States Patent
Lakhani et al.

(10) Patent No.: US 11,252,142 B2
(45) Date of Patent: Feb. 15, 2022

(54) SINGLE SIGN ON (SSO) USING CONTINUOUS AUTHENTICATION

(71) Applicant: iDee Limited, South London (GB)

(72) Inventors: Al Lakhani, Munich (DE); Dennis Kelechi Okpara, London (GB)

(73) Assignee: iDee Limited, South London (GB)

( * ) Notice: Subject to any disclaimer, the term of this patent is extended or adjusted under 35 U.S.C. 154(b) by 322 days.

(21) Appl. No.: 16/234,674

(22) Filed: Dec. 28, 2018

(65) Prior Publication Data

US 2019/0207927 A1  Jul. 4, 2019

Related U.S. Application Data

(60) Provisional application No. 62/611,731, filed on Dec. 29, 2017.

(51) Int. Cl.
*H04L 29/06* (2006.01)
*G06F 8/61* (2018.01)
(Continued)

(52) U.S. Cl.
CPC ............ *H04L 63/0815* (2013.01); *G06F 8/61* (2013.01); *G06F 21/00* (2013.01); *H04L 9/30* (2013.01);
(Continued)

(58) Field of Classification Search
CPC . H04L 63/0815; H04L 9/3226; H04L 9/3247; H04L 63/108; H04L 63/166;
(Continued)

(56) References Cited

U.S. PATENT DOCUMENTS 6,628,671 B1   9/2003 Dynarski et al.
7,536,722 B1   5/2009 Saltz et al.
(Continued)

FOREIGN PATENT DOCUMENTS

CA      2878269 A1   9/2015
CN    107464109 A   12/2017
(Continued)

OTHER PUBLICATIONS

International Preliminary Report on Patentability from counterpart International Application No. PCT/US2018/067783, dated Jul. 9, 2020.
(Continued)

*Primary Examiner* — Michael R Vaughan
(74) *Attorney, Agent, or Firm* — DLA Piper LLP (US)

(57) ABSTRACT

Systems and methods for continuous secure single sign on for secure access services. A user device stores a first authentication factor associated with a user for authorizing access. An authentication server receives an authentication request by the user to a secure access service and establishes a secure communication channel between the authentication server and the user device. The user device performs a user authentication according to a second authentication factor, generates an authentication response indicating the first authentication factor and confirming the authentication, the authentication response and transmits the response to the authentication server via the secure communication channel. The authentication server grants access to the secure access service based on the authentication response, repeatedly determines whether the secure communication channel is maintained while the user accesses the secure access service, and permits access to the secure access service by the user while the secure communication channel is maintained.

19 Claims, 12 Drawing Sheets

(51) Int. Cl.
*H04L 9/30* (2006.01)
*H04L 9/32* (2006.01)
*G06F 21/00* (2013.01)

(52) U.S. Cl.
CPC .......... *H04L 9/3226* (2013.01); *H04L 9/3247* (2013.01); *H04L 9/3268* (2013.01); *H04L 63/0869* (2013.01); *H04L 63/108* (2013.01); *H04L 63/166* (2013.01)

(58) Field of Classification Search
CPC ..... H04L 9/30; H04L 9/3268; H04L 63/0869; H04L 63/0428; H04L 2463/082; G06F 21/00; G06F 8/61; G06F 21/35; G06F 21/42; G06F 21/41; H04W 12/0605
See application file for complete search history.

(56) References Cited

U.S. PATENT DOCUMENTS

| | | | |
|---|---|---|---|
| 7,748,031 B2 | 6/2010 | Gonzalez et al. | |
| 8,045,961 B2 | 10/2011 | Ayed et al. | |
| 8,112,066 B2 | 2/2012 | Ayed | |
| 8,190,129 B2 | 5/2012 | Ayed | |
| 8,245,292 B2 | 8/2012 | Buer | |
| 8,468,582 B2 | 6/2013 | Kuang et al. | |
| 8,498,618 B2 | 7/2013 | Ayed | |
| 8,548,208 B2 | 10/2013 | Schultz | |
| 8,595,810 B1 | 11/2013 | Ayed | |
| 8,625,796 B1 | 1/2014 | Ayed | |
| 8,646,056 B2 | 2/2014 | Poplett | |
| 8,739,264 B1 | 5/2014 | Eddings et al. | |
| 8,745,709 B2 | 6/2014 | Narendra et al. | |
| 8,806,205 B2 | 8/2014 | Metke et al. | |
| 8,868,923 B1 | 10/2014 | Hamlet et al. | |
| 8,869,263 B2 | 10/2014 | Pasquero et al. | |
| 8,898,450 B2 | 11/2014 | Harjanto et al. | |
| 8,928,587 B1 | 1/2015 | Smus | |
| 8,955,067 B2 | 2/2015 | Chermside | |
| 8,955,081 B2 * | 2/2015 | Metke | H04W 12/0609 726/8 |
| 8,959,353 B2 | 2/2015 | Leoutsarakos et al. | |
| 8,994,498 B2 | 3/2015 | Agrafioti et al. | |
| 9,032,498 B1 | 5/2015 | Ayed | |
| 9,032,501 B1 | 5/2015 | Martin et al. | |
| 9,038,195 B2 | 5/2015 | Satpathy et al. | |
| 9,083,703 B2 | 7/2015 | Fiducia et al. | |
| 9,084,284 B1 | 7/2015 | Shipley et al. | |
| 9,104,853 B2 | 8/2015 | Mathur et al. | |
| 9,135,425 B2 | 9/2015 | Yau | |
| 9,210,133 B2 | 12/2015 | Yau | |
| 9,210,166 B2 | 12/2015 | Sama | |
| 9,301,139 B2 | 3/2016 | Korgaonkar | |
| 9,342,674 B2 | 5/2016 | Abdallah et al. | |
| 9,363,251 B2 | 6/2016 | Morikuni et al. | |
| 9,515,958 B2 | 12/2016 | Satpathy et al. | |
| 9,520,918 B2 | 12/2016 | Adrangi et al. | |
| 10,701,067 B1 * | 6/2020 | Ziraknejad | G06F 21/6209 |
| 10,740,481 B2 * | 8/2020 | Lakhani | G06F 21/35 |
| 2003/0046228 A1 | 3/2003 | Berney | |
| 2009/0146947 A1 | 6/2009 | Ng | |
| 2010/0281249 A1 | 11/2010 | Das et al. | |
| 2011/0016320 A1 * | 1/2011 | Bergsten | H04L 63/08 713/170 |
| 2011/0314539 A1 | 12/2011 | Horton | |
| 2013/0305325 A1 | 11/2013 | Headley | |
| 2014/0157381 A1 | 6/2014 | Disraeli | |
| 2014/0208112 A1 | 7/2014 | McDonald et al. | |
| 2014/0279528 A1 | 9/2014 | Slaby et al. | |
| 2014/0282877 A1 * | 9/2014 | Mahaffey | H04W 12/08 726/3 |
| 2014/0282878 A1 | 9/2014 | Sergey et al. | |
| 2015/0039908 A1 | 2/2015 | Lee et al. | |
| 2015/0040203 A1 | 2/2015 | Qian | |
| 2015/0067824 A1 | 3/2015 | Chatterton et al. | |
| 2015/0074826 A1 | 3/2015 | Shuto | |
| 2015/0113608 A1 | 4/2015 | Chermside | |
| 2015/0237052 A1 | 8/2015 | Brique et al. | |
| 2015/0244711 A1 | 8/2015 | Venkataraman et al. | |
| 2015/0281227 A1 | 10/2015 | Ivey et al. | |
| 2016/0014116 A1 | 1/2016 | Babbidge et al. | |
| 2016/0050321 A1 | 2/2016 | Tassone et al. | |
| 2016/0197914 A1 | 7/2016 | Oberhide et al. | |
| 2016/0248764 A1 | 8/2016 | Morikuni et al. | |
| 2016/0261411 A1 | 9/2016 | Yau et al. | |
| 2016/0373430 A1 | 12/2016 | Bhat et al. | |
| 2017/0026379 A1 | 1/2017 | Lu et al. | |
| 2017/0085498 A1 | 3/2017 | Satpathy et al. | |
| 2018/0332033 A1 * | 11/2018 | Lakhani | G06F 21/35 |
| 2018/0336359 A1 * | 11/2018 | Lakhani | G06F 21/6209 |

FOREIGN PATENT DOCUMENTS

| | | |
|---|---|---|
| WO | 2015/071707 | 5/2015 |
| WO | 2015/073979 A1 | 5/2015 |
| WO | 2017/085546 A1 | 5/2017 |

OTHER PUBLICATIONS

International Search Report and Written Opinion from corresponding International Application No. PCT/IB2016/001722, dated April 5, 2017.

International Search Report and Written Opinion from corresponding International Application No. PCT/IB2016/001719, dated April 5, 2017.

International Preliminary Report on Patentability from corresponding International Application No. PCT/IB2016/001722, dated May 31, 2018.

International Preliminary Report on Patentability from corresponding International Application No. PCT/IB2016/001719, dated May 31, 2018.

International Search Report and Written Opinion from counterpart International Application No. PCT/US2018/067783, dated Mar. 26, 2019.

Extended European Search Report from corresponding European Patent Appln. No. 18894184.3 dated Aug. 2, 2021.

* cited by examiner

SINGLE SIGN ON (SSO) USING CONTINUOUS AUTHENTICATION

TECHNICAL FIELD

The present disclosure is generally directed to digital security systems, and more particularly, to systems and methods for permitting single sign on secure access to plural computing services via continuous authentication.

BACKGROUND

Users typically employ one or more credentials to securely access a computing service. As the number of computing services increases, there is generally an increase in the number of different credentials maintained by the user to secure their resources on these computing services. Due to the difficulty of remembering different credentials (which may include sets of credentials), users tend to choose weak credential(s) or use the same credential(s) across multiple computing services. As a result, attackers typically target user credentials in order to gain unauthorized access to the user's resources. Current security solutions, such as conventional password managers and conventional single sign on (SSO) procedures, may attempt to solve this problem, but have limitations.

For example, conventional password managers may use a master password to protect all of the user's credentials. This brings the risk of a single point of failure, as the compromise of the master password means that all of the user credentials are made available to the attacker.

Conventional single sign on procedures rely on authenticating the user once, and then using an access token (ticket) to grant the user access to other services. The access token grants the user access to computing services within a defined validity period or time frame. Additionally, conventional SSO procedures may also offer password manager functionality. However, conventional SSO procedures have the same single point of failure problem. This is because once the first authentication is successfully compromised, all subsequent authentications to the other services cannot detect and/or have no means of checking the authenticity and the provenance of the credentials that were used to authenticate to a first service. In addition, with conventional SSO token-based procedures, the user loses control regarding how the access token is used by the credential service provider and, therefore, the user has no knowledge of which computing services are being accessed (such as the case of the data breach experienced in 2018 by Facebook, Inc., where about 50 million user accounts were compromised due to a vulnerability that revealed users' access tokens).

There is a need for a secure single sign on solution that does not rely on access tokens (or tickets), to allow a user access to different computing services without the need to re-authenticate to each computing service.

SUMMARY

Aspects of the present disclosure relate to security system and methods for providing secure access to plural access services. The security system includes at least one user device and an authentication server. The at least one user device stores a first authentication factor associated with a user for authorized access to plural secure access services. The authentication server is communicatively coupled to the at least one user device via a network. The authentication server is configured to: receive a first authentication request for authorized access by the user to a first secure access service among the plural secure access services and, responsive to the first authentication request, establish a secure communication channel between the authentication server and the at least one user device. The at least one user device, responsive to the establishing of the secure communication channel, is configured to: perform an authentication of the user via at least one user device according to a second authentication factor, responsive to the authentication of the user, generate an authentication response to the authentication server confirming the authentication, where the authentication response indicates the first authentication factor, and transmit the authentication response to the authentication server via the secure communication channel. The authentication server grants access to the first secure access service based on the authentication response. The authentication server is further configured to: repeatedly determine whether the secure communication channel between the authentication server and the at least one user device is maintained while the user accesses the first secure access service, and permit access to the first secure access service by the user while the secure communication channel is maintained.

DETAILED DESCRIPTION

Figure 1:
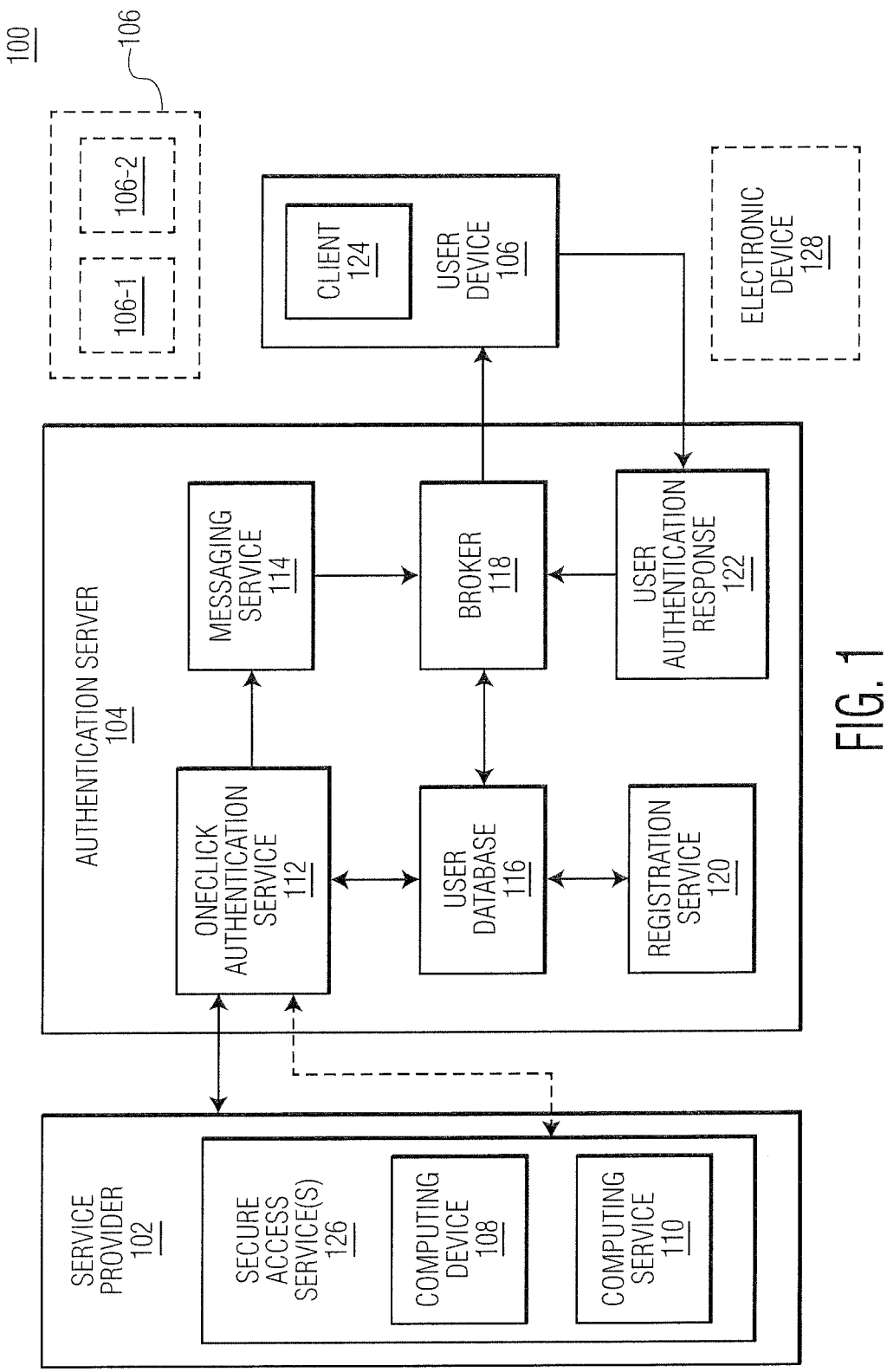
FIG. 1 is a functional block diagram of an exemplary embodiment of a security system, according to an aspect of the present disclosure.

Aspects of the present disclosure relate to security systems and methods for secure access across plural secure access services according to a continuous multi-factor authentication (CMFA) procedure between an authentication server and at least one user device. Example systems of the present disclosure include MF authentication across an authentication server and at least one user device. The authentication factors may include a first authentication factor generated during registration on the user device. At least a second authentication factor may be determined via user authentication on the user device. In operation, the authentication server, responsive to an authentication request for access to a secure access service, may establish a secure communication channel with the user device according to a predefined authentication protocol (for example, a mutual authentication). The user device (or, in some examples, two user devices) may perform a user authentication based on a second authentication factor (e.g., a knowledge component and/or an inherence component) to generate an authentication response. In some examples, a first user device may also use a presence of a second user device or establishment of a further secure communication channel between the first and second user devices to generate the authentication response. The user device may also indicate the first authentication factor in the response (e.g., as a cryptographic key that digitally signs the response). The authentication server, based on the response, may grant access to the secure access service. In addition, the authentication server may repeatedly determine whether the secure communication channel between the authentication server and the user device is maintained while the user accesses the first secure access service (to continuously authenticate the user through the user device), and may permit access to the first secure access service to the user while the secure communication channel is maintained.

There is a need to leverage continuous multi-factor authentication (CMFA) across multiple computing services without relying on pre-stored passwords, and access token/tickets created by credential service providers (CSP), as currently performed for SSO in conventional identity and access management systems.

CMFA, as described in the present disclosure, may use similar authenticators as MFA but unlike MFA, CMFA maintains the achieved authentication until the end of the session. This means that if the multi-factor (MF) authenticator that was used to authenticate the user is not available, then the authenticated session ends.

Existing SSO solutions rely on user pre-stored credentials or access token (or tickets) created by the CSP to authenticate users to different computing services, without requiring the user to authenticate to them individually. When a user wants to access a computing service, the user is authenticated to the CSP. If successful, the CSP creates an access token (or ticket) for the user with a validity period. The access token is then passed to the computing service to grant access to the user. If the user tries to access another computing service, the CSP uses SSO services and checks if the access token is still valid, and passes the access token to the computing service without re-authenticating the user. If the access token has expired, the CSP re-authenticates the user to create a fresh access token that the user uses to access the computing service. This type of authentication relies solely on the CSP being able to secure the access token. The user doesn't have any control over the access token. There's no further check performed by the CSP to be sure that the user is still who they claim to be at the point of accessing another computing service. The same is applicable to SSO solutions that pre-store user credentials. The only difference is that the user pre-stored credentials are sent to the computing service, instead of access tokens, after the user has authenticated with a master password to the CSP.

With continuous single sign-on (CSSO) authentication, as described in the present disclosure, when a user wants to access a computing service, the user is authenticated to the computing service via an authentication server using CMFA. Afterwards, the user is continuously authenticated to the authentication server with their multi-factor authenticator while they are using the computing service. When the user switches from the original computing service to the subsequent computing service, the authentication server recognizes that it is the same user on the same device and, therefore, the user doesn't need to be re-authenticated. In other words, CSSO specifies that the user be continuously authenticated and maintains a secure continuous connection with the authentication server. Furthermore, CSSO does not rely on access tokens (or tickets), which produces enhanced security compared to existing SSO solutions that rely on access tokens (or tickets) and pre-stored credentials.

CSSO authentication of the present disclosure may provide advantages. If a real user did not log out of their device and an attacker happens to have access to their device, the attacker can access all computing services that are tied to the SSO token-based solution. The attacker does not need to have the real user authentication parameters (e.g., a password) as re-authentication is not required, provided that the access token created by the CSP is still valid. With CSSO, if the user stops using a computing service, the use of the subsequent computing service requires re-authentication because of continuous MFA.

In existing SSO solutions, when a user switches from the original computing service, where the user was authenticated, to a subsequent computing service, as long as the authentication token is valid, access is granted. Therefore, the attacker can secretly and maliciously use the token to get additional access to other computing services without the knowledge of the user. This is how the United States Office of Personnel Management (OPM) and 2018 Facebook, Inc. breaches were perpetrated. However, with CSSO, before providing access to the subsequent computing service, the authentication server confirms that the user is continuously authenticated using CMFA, and only then informs the relying party (the subsequent computing service) to grant the user access. If there is a break in the CMFA, the user is required to re-authenticate.

In existing SSO solutions, if an attacker can compromise the CSP and get hold of the access tokens created by the CSP, when the user was authenticated, the attacker can obtain valid access tokens to access all the resources for all the users, which creates a single point of failure for the CSP. However, with CSSO, an attacker that gained access to the authentication server does not obtain any tokens to access user resources. Instead, with CSSO, the attacker would need to be in physical possession of the user's device while the continuous authentication is maintained, to access and/or switch from one computing service to another.

In existing SSO solutions, even if a user logs out from the first computing service, clicking on another computing service would allow access if the access token created for the first service has not expired. This is not possible with CSSO, because the same user on the same device needs to be present and authenticated at that point in time to request access to the subsequent computing service. Therefore, when the user decides to terminate the existing session, no one would be able to access any of the other computing services available to the user.

In existing pre-stored credential SSO solutions, if an attacker manages to access the master account, the attacker could access all the user resources from anywhere using the pre-stored credentials. And can even obtain and modify the individual computing services credentials to deny the real user access to them, i.e., account takeover. Account takeover is one of the fastest growing fraud threats for ecommerce. With CSSO, an attacker has no credentials to harvest, as credential are not stored.

If the CSP server is compromised, in existing pre-stored credential SSO solutions, an attacker is able to obtain all the CSP user credentials from the database without even needing any of the user master passwords. This was the case, for example, in the 2017 data breach experienced by OneLogin, Inc., where the threat actor was able to access database tables that contained information about users, apps, as well as various types of keys.

With CSSO, no user identity credential is stored on the server; the users are in sole control of their authentication factors. As such, CSSO may be verifier compromise resistant.

FIG. 1 is a functional block diagram of example security system 100, according to aspects of the present disclosure. System 100 may include one or more service providers 102, authentication server 104 and at least one user device 106. System 100 may also include one or more secure access services 126 associated with service provider(s) 102. Service provider(s) 102, authentication server 104, user device(s) 106 and secure access service(s) 126 may be configured to communicate via one or more networks (not shown). Although FIG. 1 illustrates one service provider 102, it is understood that FIG. 1 illustrates an example configuration, and that system 100 may include one or more service providers 102. Although, authentication server 104 is illustrated as being a single server, in some examples the functions of server 104 may be distributed among two or more servers.

Service provider(s) 102 may include any entity associated with and providing users with access to secure access service(s) 126. Service provider(s) 102 may include an owner of secure access service(s) 126 that a user may desire via security system 100. Service provider(s) 102 may also include a relying party that may not own secure access service 126, but may rely on security system 100 to authenticate users for access to secure access service(s) 126. Service provider(s) 102 may include, without being limited to, application service providers, network service providers, internet service providers, storage service providers, telecommunications service providers, online service providers and payment service providers. Service provider(s) 102 may also include any entity associated with access to one or more physical access points.

In general, secure access service(s) 126 may include physical or virtual locations, where access may only be granted through authentication via security system 100. Services(s) 126 may include, without being limited to, access to websites, mobile applications, home/office appliances, home/office/other electronics, vehicles, home/office/other physical access points (e.g., building door(s), etc.), multimedia devices (e.g., vehicle infotainment systems, home multimedia systems, home automation systems, ATMs and credit card/debit card payment readers.

Secure access service(s) 126 may include one or more computing devices 108 and/or one or more computing services 110 for secure access by a user (e.g., via user device 106 and/or electronic device 128). In some examples, system 100 may include one or more computing services 110 and may not include any computing devices 108. In some examples, system 100 may include one or more computing devices 108 and may not include any computing services 110. Computing device(s) 108 may represent, for example, personal computers, smartphones, appliances, electronics, vehicles, physical access points, multimedia devices, home automation systems, ATMs, card readers. Computing service(s) 110 may represent, for example, websites, online applications and mobile applications.

Authentication server 104 may be configured to control authentication of a user to one or more secure access services 126, according to a CSSO process using user device 106. The CSSO process includes performing a multifactor authentication with user device 106 using authentication information. In some examples, the authentication information may be stored on user device 106. In some examples, the authentication information may include one or more factors such as, without being limited to, contextual authentication (for example, geolocation information, an internet protocol (IP) address, a time, a user device fingerprint, one or more user device network attributes (e.g., smartphone subscriber identity module (SIM) characteristics, etc.), one or more user device usage (i.e., behavioral) attributes (for example, keystrokes, typing pattern, browsing pattern, etc.) artificial intelligence information and proof of possession of a verified identity (for example, scanning a driver's license, a National ID, etc.). The CSSO process further includes continuous monitoring of user device 106 (by authentication server 104) once the user is authenticated via user device 106. The continuous monitoring of the authenticated user device 106 allows authentication server 104 to confirm that the same user having the same user device 106 is present and authenticated at any point in time. Thus, when authentication server 104 receives an authentication request from service provider 102 to access a new (subsequent) secure access service 126, authentication server 104 can provide immediate confirmation to service provider 102 to grant access, without using previously generated tokens or pre-stored tokens or pre-stored credentials or additional security credentials from the user. When, during continuous monitoring, authentication server 104 determines that user device 106 is no longer authenticated, authentication server 104 requests user device 106 to perform a re-authentication, and denies access to secure access service 126 as long as user device 106 is not authenticated. Examples of the CSSO process between authentication server 104 and user device(s) 106 for secure access to plural secure access services 126 are described further below with respect to FIGS. 5-11.

Authentication server 104 may include authentication service 112, messaging service 114, user database 116, broker 118 and registration service 120. Components of authentication server 104 may communicate with each other via a communication and data bus (not shown).

User database 116 may be configured to store user data from one or more users. The user data may be collected (and/or generated) as part of a registration phase. The user information may include, for example, a user identity, user credentials, user preferences for one or more particular secure access services 126, and any other suitable information.

Registration service 120 may be configured to derive and/or obtain, for each user, one or more user devices 106 and a user identifier associated with authentication server 104 (e.g., a unique anonymous ID that may be used to identify a user). In some examples, registration service 120 may be configured to derive and/or obtain, for each user, one or more user identifier(s) and/or parameters associated with one or more secure access services 126 (which may be different from the user identifier associated with authentication server 104). Registration service 120 may communicate with user database 116 to store the derived/obtained information during registration. During registration, authentication server 104 may also install client 124 on user device 106. In some examples, client 124 may include a Message Queue Telemetry Transport Protocol (MQTT) client.

Messaging service 114 may be configured to assign a unique identifier to client 124 (referred to herein as a client identifier) during registration. The client identifier may be stored in user database 116. In some examples, the client identifier may be same as the user identifier associated with authentication server 104. Messaging service 114 may use the client identifier to identify the user and/or user device 106 for sending an authentication request and other subsequent requests. In some examples, messaging service 114 may include an MQTT server.

Authentication service 112 (also referred to herein as a one-click authentication service 112 or OAS 112) may be configured to communicate with service provider(s) 102, secure access service(s) 126 (e.g., computing device(s) 108 and/or computing service(s) 110) and user device 106 (and/or electronic device 128), for receiving authentication request(s) for granting access to associated secure access service(s) 126. Responsive to an authentication request, authentication service 112 may identify the associated user via user database 116. Authentication service 112 may instruct messaging service 114 to send an authentication request to a user authenticator (on user device 106) for the identified user via broker 118.

Broker 118 may be configured to receive the authentication request from messaging service 114. Responsive to the authentication request, broker may send the request to client 124 on user device 106. Client 124 may transmit user authentication response 122 (from the user authenticator) to broker 118. Broker 118 may validate the received authentication response 122 with the information stored in user database 116. In some examples, broker 118 may include an MQTT broker.

Broker 118 may send a validation conformation to authentication service 112. Responsive to the validation confirmation, Authentication service 112 may communicate with service provider 102 with the user authentication status.

In some examples, authentication server 104 may use MQTT protocol for continuous monitoring of user authentication. It is understood that other suitable protocols for continuous monitoring may also be used. In general, MQTT is an ISO standard (ISO/IEC PRF 20922) publish-subscribe-based "lightweight" messaging protocol for use on top of the TCP/IP protocol. It is designed for constrained devices and low-bandwidth, high-latency or unreliable networks.

MQTT messages may be delivered asynchronously ("push") through a publish-subscribe architecture. The MQTT protocol operates by exchanging a series of MQTT control packets in a defined manner. Each control packet has a specific purpose and every bit in the packet is carefully crafted to reduce the data transmitted over the network. In the examples herein, MQTT protocol may be used by messaging service 114, broker 118 and client(s) 124.

MQTT broker 118 may handle connected MQTT clients 124 (of user device(s) 106). Broker 118 may be primarily responsible for receiving all messages (from messaging service 114), filtering the messages, identifying a particular client 124 based on the messages, and then sending the message to the particular subscribed client 124. Broker 118 may also hold a session of all persisted clients. Broker 118 may also be responsible for the authentication and authorization of response(s) 122 from client(s) 124.

In general, MQTT client 124 may include an MQTT library and may connect to MQTT broker 118 over a network. MQTT client 124 may use a certificate-based transport layer security (TLS) mutual authentication for establishing a secure communication channel with broker 118. Each MQTT client 124 may be associated with a client identifier which is used by broker 118 for identifying client 124 and a current state of client 124. MQTT client 124 may be both a publisher and a subscriber at the same time.

Messaging service 114 may be a publisher (e.g., sending messages, sending authentication requests, sending keep alive indications, etc.). MQTT clients 124 (authentication server 104-enabled devices) may subscribe to receive these messages (e.g., authentication requests, keep alive indications, etc.) from messaging service 114 via MQTT broker 118. In other words, broker 118 may receive the messages from messaging service 114, filter the messages and send the messages to the respective clients 124 subscribed to the messages.

Although not shown in FIG. 1, in some examples, computing device 108 may include client 124. In some examples, computing device 108 may be configured to receive messages from one or more messaging services, to maintain a continuous authentication (e.g., monitor computing device 108) between authentication server 104 and computing device 108. (An example of such a scenario is described further below with respect to FIG. 11.) In some examples, computing device 108 may include client 124 comprising an MQTT client, as discussed above. In some examples, both user device 106 and computing device 108 may include MQTT client 124.

In some examples, authentication service 112 may use an MQTT connection between client 124 (e.g., a user MF authenticator, computing device 108) and broker 118 to achieve continuous authentication with the authenticated secure access service(s) 126. For example, once a connection is established between broker 118 and client 124 (and/or computing device 108), broker 118 may keep the connection open as long as client 124 does not send a disconnect command or loses the established connection. Client 124 may specify a time interval (e.g., a "keep alive" in seconds) and may communicate the time interval to broker 118 during establishment of the connection. The keep alive indication may be a time interval client 124 commits to, by sending regular PING request messages to broker 118. Broker 118 may respond with a PING response message. The PING request/response messages may allow both sides (broker 118 and client 124) to determine whether the other side is still alive and reachable. Broker 118 may be configured to disconnect client 124 when client 124 does not send any message within the keep alive interval. Likewise, client 124 may be configured to close the connection (disconnect) when a response from broker 118 is not received in a predetermined amount of time. Thus, the keep alive functionality assures that the connection is still open and both broker 118 and client 124 are connected to one another; thereby providing continuous authentication between authenticated user device 106 and authentication server 104.

When there is no continuous authentication (e.g., client 124 and/or computing device 108 is disconnected from broker 118), access to secure access service(s) 126 is ended.

In some examples, system 100 may include one user device 106, such as user device 106-1 (e.g., shown in FIG. 6) for continuous authentication. In some examples, system 100 may include two user devices, for example, user device 106-1 and user device 106-2 (e.g., shown in FIGS. 8 and 9) for continuous authentication. In some examples, user device 106-2 may include a wearable device. Examples of user device 106-1 and user device 106-2 are described further below with respect to FIGS. 2A and 2B. In some examples, user device 106 may be configured to communicate and interact with secure access service(s) 126. User device 106 may include any suitable electronic device that can communicate with and interact with authentication server 104. Examples of user device 106 may include, without being limited to, mobile phones, tablet computers, personal computers (e.g., desktop computers or laptop computers), and wearable devices (e.g., smart watches, fitness trackers, health trackers, jewelry (e.g., a necklace, an earring, etc.) and specialized wearable devices).

In some examples, where system 100 includes user device 106-1 and user device 106-2, user devices 106-1, 106-2 may be configured to wirelessly communicate with each other via any suitable short-range wireless communication standard, such as, without being limited to, Bluetooth, near field communication (NFC) and ultra-wide band (UWB) standards. In some examples, user devices 106-1, 106-2 may be configured to wirelessly communicate with each other via any suitable long-range-wireless channel. Non-limiting examples of wireless communication protocols include radio frequency identification (RFID), WiFi, Worldwide Interoperability for Microwave Access (WiMAX), ZigBee, frequency division multiple access (FDMA), time division multiple access (TDMA), code division multiple access (CDMA), and long-term evolution (LTE).

In some examples, system 100 may include electronic device 128 for communication with secure access service(s) 126. In some examples, electronic device 128 may communicate with secure access service(s) 126, and user device 106 (or user devices 106-1, 106-2) may be used by authentication server 104 for CSSO authentication, as electronic device 128 accesses different secure access services 126. In some examples, both electronic device 128 and user device 106 may communicate with secure access service(s) 126. Electronic device 128 may include any suitable electronic device that can communicate with and interact with secure access service(s) 126. Examples of electronic device 128 may include, without being limited to, mobile phones, tablet computers and personal computers (e.g., desktop computers or laptop computers).

Figure 2A:
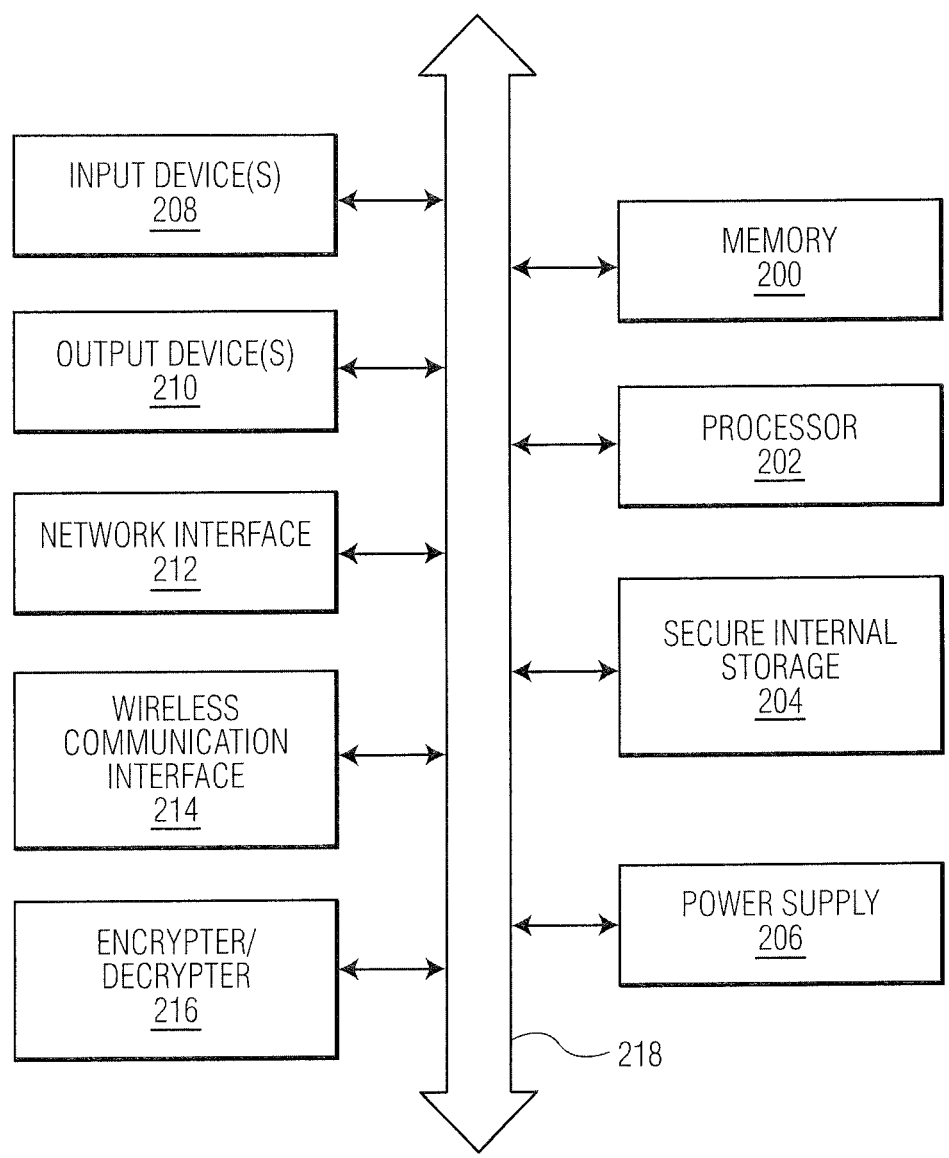
FIG. 2A is a functional block diagram of an exemplary user device of the system shown in FIG. 1, according to an aspect of the present disclosure.

FIG. 2A is a functional block diagram illustrating an example user device 106-1 (106) according to aspects of the present disclosure. Illustratively, user device 106-1 (106) may include non-transitory memory 200, processor 202, secure internal storage 204 (also referred to herein as secure storage 204), power supply 206, one or more input device 208, one or more output devices 210, network interface 212, wireless communication interface 214, and encrypter/decrypter 216. Secure internal storage 204 may be configured to store security credentials for MF authentication with authentication server 104. Components of user device 106-1 (106) may communicate with each other via communication and data bus 218.

Examples of user device 106-1 (106) may include, without being limited to, mobile phones, tablet computers and personal computers (e.g., desktop computers or laptop computers). In some examples, user device 106-1 (106) may include a wearable device, such as, without being limited to, a smart watch, a fitness tracker, a health tracker, jewelry (e.g., a necklace, an earring, etc.) and a specialized wearable device.

Processor 202 may be configured to control one or more components of user device 106-1 (106) (i.e., non-transitory memory 200, secure internal storage 204, power supply 206, input device 208, one or more output devices 210, network interface 212, wireless communication interface 214, and encrypter/decrypter 216. Processor 202 may include, without being limited to, a microprocessor, a central processing unit, an application specific integrated circuit (ASIC), a field programmable gate array (FPGA) and/or a digital signal processor (DSP). Processor 202 may be configured to execute processing logic for performing the operations described herein. In general, processor 202 may include any suitable special-purpose processing device or a general-purpose processing device specially programmed with processing logic to perform the operations described herein.

Memory 200 may include, for example, without being limited to, at least one of a read-only memory (ROM), a random access memory (RAM), a flash memory, a dynamic RAM (DRAM) and a static RAM (SRAM), storing computer-readable instructions (i.e., programming logic) executable by processor 202. In general, memory 200 may include any suitable non-transitory computer readable storage medium storing computer-readable instructions executable by processor 202 for performing the operations described herein. Although one memory 200 is illustrated in FIG. 2, in some examples, user device 106-1 (106) may include two or more memory devices (e.g., dynamic memory and static memory).

In some examples, memory 200 may include a data storage device storing instructions (e.g., software) for performing any one or more of the functions described herein (including the predetermined operation modes as described herein). The data storage device may include any suitable non-transitory computer-readable storage medium, including, without being limited to, solid-state memories, optical media and magnetic media.

In some examples, secure storage 204 may include built-in internal storage (such as hardware and/or software-based secure storage space) that is part of user device 106-1 (106) and/or registration-generated storage (e.g., hardware and/or software-based secure storage space). In some examples, built-in internal storage may be configurable according to device manufacturer and/or owner specifications. In some examples, one or more components of system 100 (such as registration service 120) may control configuration of registration-generated storage. In general, the storage configuration may include storage access and/or storage allocation. The security credentials stored in secure storage 204 may include encryption/decryption keys for creating a secure communication channel between user device 106-1 (106) and authentication server 104.

In some examples, user device 106-1 (106) may include input device(s) 208 for receiving one or more user inputs from a user of user device 106-1 (106). Input device(s) 208 may include, for example, one or more buttons, an alphanumeric input device, a cursor control device, a microphone, a camera and/or a touch-sensitive input device (such as a touch-sensitive display device). Input device(s) 208 may also include any other suitable input devices and/or sensors 218 for accepting/capturing user input (e.g., motion, user position, biometric data, etc.) Example, biometric data may include, without being limited to a fingerprint, a retina signature (i.e., eye scan data), a heartbeat signature and a voiceprint. Output device(s) 210 may include any suitable user output device, such as a display, a loudspeaker, a vibration sensor, etc.

Network interface 212 may be configured to communicate with authentication server 104 over a communication network (not shown). The communication network may include one or more private and/or public networks.

In some examples, wireless communication interface 214 may be configured to wirelessly communicate with user device 106-2 via a wireless communication channel. Wireless communication interface 214 may be configured to wirelessly communicate with user device 106-2 via any suitable short-range wireless communication standard, such as, without being limited to, Bluetooth, NFC and UWB standards. In some examples, wireless communication interface 214 may be controlled by processor 202 to interact with user device 106-2 such that information may be passed between user device 106-1 and user device 106-2 (i.e., over a short-range or long-range wireless communication channel). In some examples, wireless communication interface may be configured to wirelessly communicate with electronic device 128 via a wireless communication channel.

Encrypter/decrypter 216 may be configured to encrypt and decrypt data sent between user device 106-1 (106) and authentication server 104 according to encryption/decryption keys stored in secure internal storage 204. In some examples, encrypter/decrypter 216 may be configured to encrypt and decrypt data sent between user device 106-1 and user device 106-2. In some examples, encrypter/decrypter 214 may include a cryptographic engine for carrying out cryptographic operations such as encryption, decryption, public and/or private key generation, pseudo-random number generation, digital signatures, etc. The cryptographic engine may include software, hardware and/or a combination thereof for performing cryptographic operations using one or more cryptographic algorithms. In some examples, the cryptographic engine may include a hardware device (e.g., a dedicated computer on a chip or a microprocessor) for carrying out cryptographic operations. In some examples, the cryptographic engine may include a separate device (e.g., a co-processor) in electronic communication with processor 202. In some examples, the cryptographic engine may be integrated into processor 202 itself.

User device 106-1 (106) may include any suitable hardware and/or software components for performing the functions described herein.

Figure 2B:
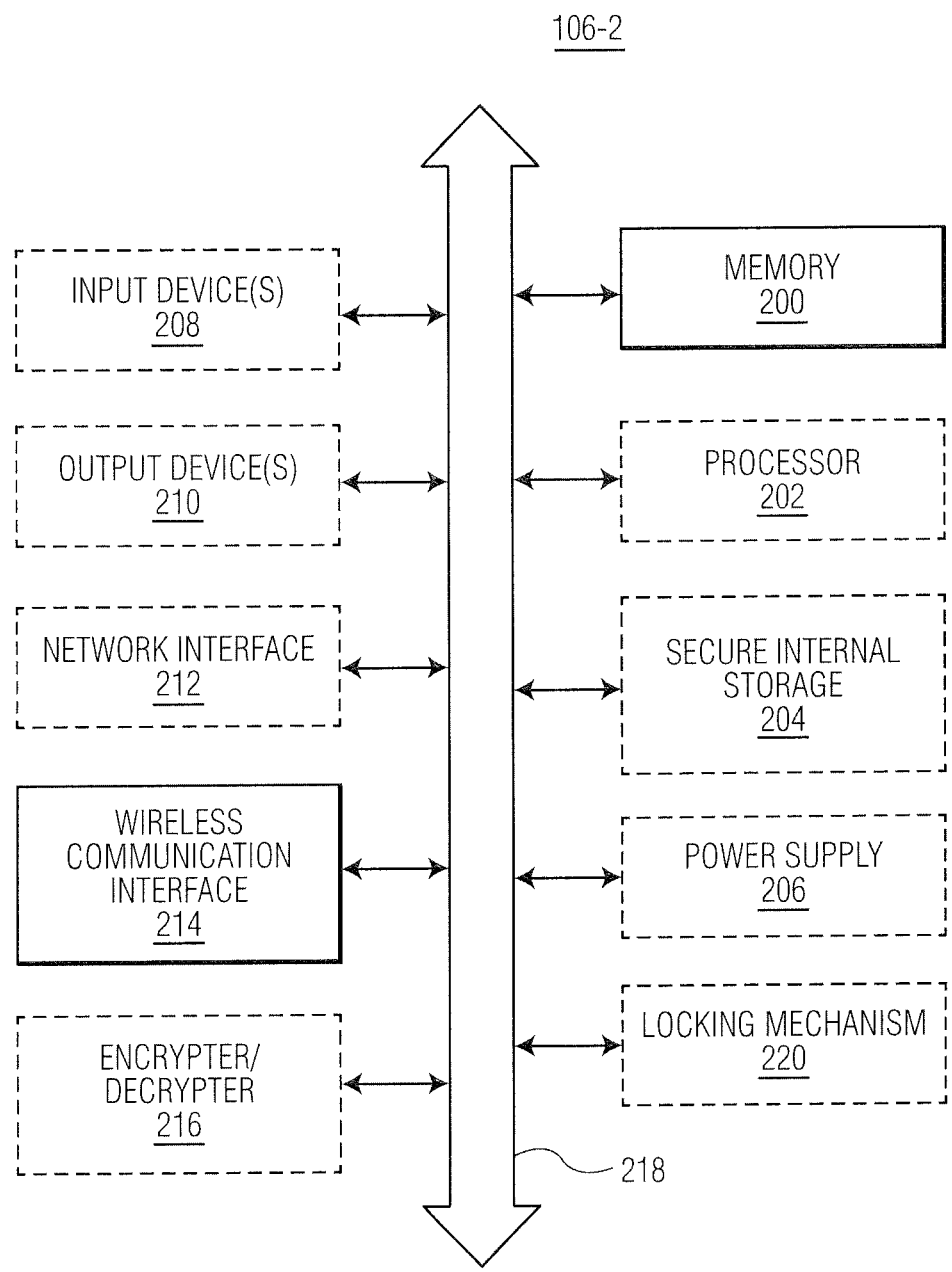
FIG. 2B is a functional block diagram of an exemplary user device of the system shown in FIG. 1, according to another aspect of the present disclosure.

FIG. 2B is a functional block diagram illustrating an example user device 106-2 according to aspects of the present disclosure. Illustratively, user device 106-2 may include non-transitory memory 200, optional processor 202, optional secure internal storage 204, optional power supply 206 (e.g., a battery) for powering user device 106-2, optional input device(s) 208, optional output device(s) 210, optional network interface 212, wireless communication interface 214, optional encrypter/decrypter 216 and optional physical locking mechanism 220. In some examples, user device 106-2 may include encrypter/decrypter 216. In other examples, user device 106-2 may not include encrypter/decrypter 216. In some examples, user device 106-2 may include secure internal storage 204. In other examples, user device 106-2 may not include secure internal storage 204. In examples of user device 106-2 that do not include secure internal storage 204, information described as being stored in storage 204 may be stored in memory 200. Components of user device 106-2 may communicate with each other via a communication and data bus 218.

Memory 200, optional processor 202, optional secure internal storage 204, optional input device(s) 208, optional output device(s) 210, optional network interface 212, wireless communication interface 214 and optional encrypter/decrypter 216 are similar to memory 200, processor 202, secure internal storage 204, input device(s) 208, output device(s) 210, network interface 212, wireless communication interface 214 and encrypter/decrypter 216 described above with respect to FIG. 2A.

In some examples, user device 106-2 may include any compatible portable electronic device that can communicate wirelessly and interact with user device 106-1. Examples of user device 106-2 may include, without being limited to, mobile phones, tablet computers and laptop computers.

In some examples, user device 106-2 may include a wearable device that is capable of being coupled to the user (i.e., worn by the user). For example, the wearable device may include a smart watch, a fitness tracker, a health tracker, a specialized wearable device configured as jewelry, etc. In some examples, a wearable user device 106-2 may include optional physical locking mechanism 220. Mechanism 220 may be configured to detect whether user device 106-2 is coupled to and/or secured to the user. For example, mechanism 220 may detect skin coupling of user device 106-2 to the user. In some examples, mechanism 220 may detect other biometric data (e.g., a heartbeat, a pulse, respiration, etc.) to determine whether user device 106-2 is coupled to and/or secured to the user. As another example, mechanism 220 may detect closure or opening of a physical locking device, such as a clasp. In some examples, processor 202 of user device 106-2 may be configured to send a secured and/or unsecured indication to user device 106-2 based on coupling/non-coupling detection by optional mechanism 220.

User device 106-2 may include any suitable hardware and/or software components for performing the functions described herein.

Figure 3:
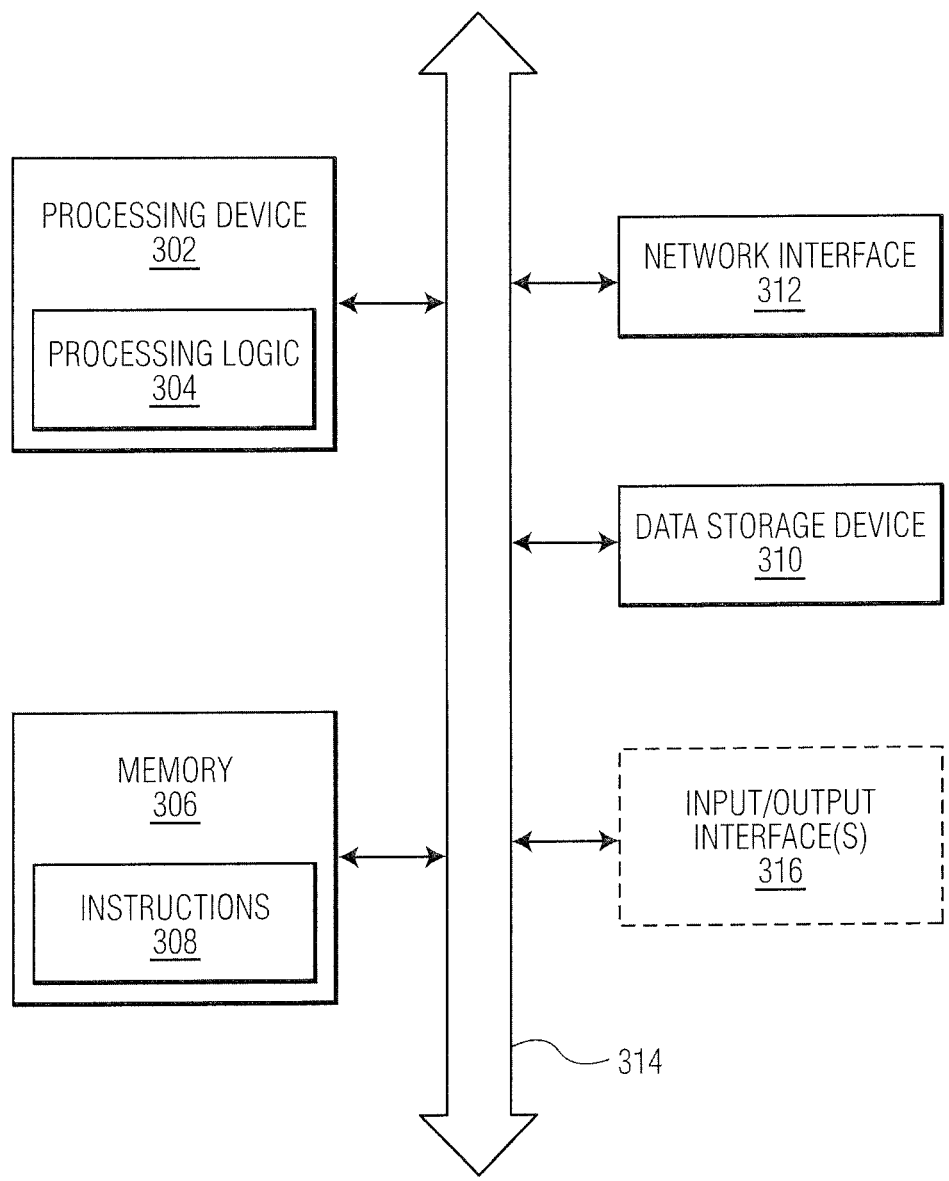
FIG. 3 is a functional block diagram of an exemplary authentication server of the system shown in FIG. 1, according to an aspect of the present disclosure.

FIG. 3 illustrates a functional block diagram of an example authentication server 104 in the example form of a computer system within which a set of instructions for causing the machine to perform any one or more of the methodologies discussed herein may be executed. In some examples, the machine may be connected (e.g., networked) to other machines. The machine may be any machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein.

Example authentication server 104 may include processing device 302, memory 306, data storage device 310 and network interface 312, which may communicate with each other via data and control bus 314. In some examples, authentication server 104 may also include input/output interface(s) 316.

Processing device 302 may include, without being limited to, a microprocessor, a central processing unit, an application specific integrated circuit (ASIC), a field programmable gate array (FPGA), a digital signal processor (DSP) and/or a network processor. Processing device 302 may be configured to execute processing logic 304 for performing the operations described herein. In general, processing device 302 may include any suitable special-purpose processing device or a processing device specially programmed with processing logic 304 to perform the operations described herein.

Memory 306 may include, for example, without being limited to, at least one of a read-only memory (ROM), a random access memory (RAM), a flash memory, a dynamic RAM (DRAM) and a static RAM (SRAM), storing computer-readable instructions 308 executable by processing device 302. In general, memory 306 may include any suitable non-transitory computer readable storage medium storing computer-readable instructions 308 executable by processing device 302 for performing the operations described herein. Although one memory device 306 is illustrated in FIG. 3, in some examples, authentication server 104 may include two or more memory devices (e.g., dynamic memory and static memory).

Authentication server 104 may include network interface 312, for communication with other computers (including wired and/or wireless communication) and/or for communication with a network. In some examples, authentication server 104 may include input/output interface(s) 316 (e.g., such as a display device, a user interface, etc.).

In some examples, authentication server 104 may include data storage device 310 storing instructions for performing any one or more of the functions described herein. Data storage device 310 may include any suitable non-transitory computer-readable storage medium, including, without being limited to, solid-state memories, optical media and magnetic media.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 9:
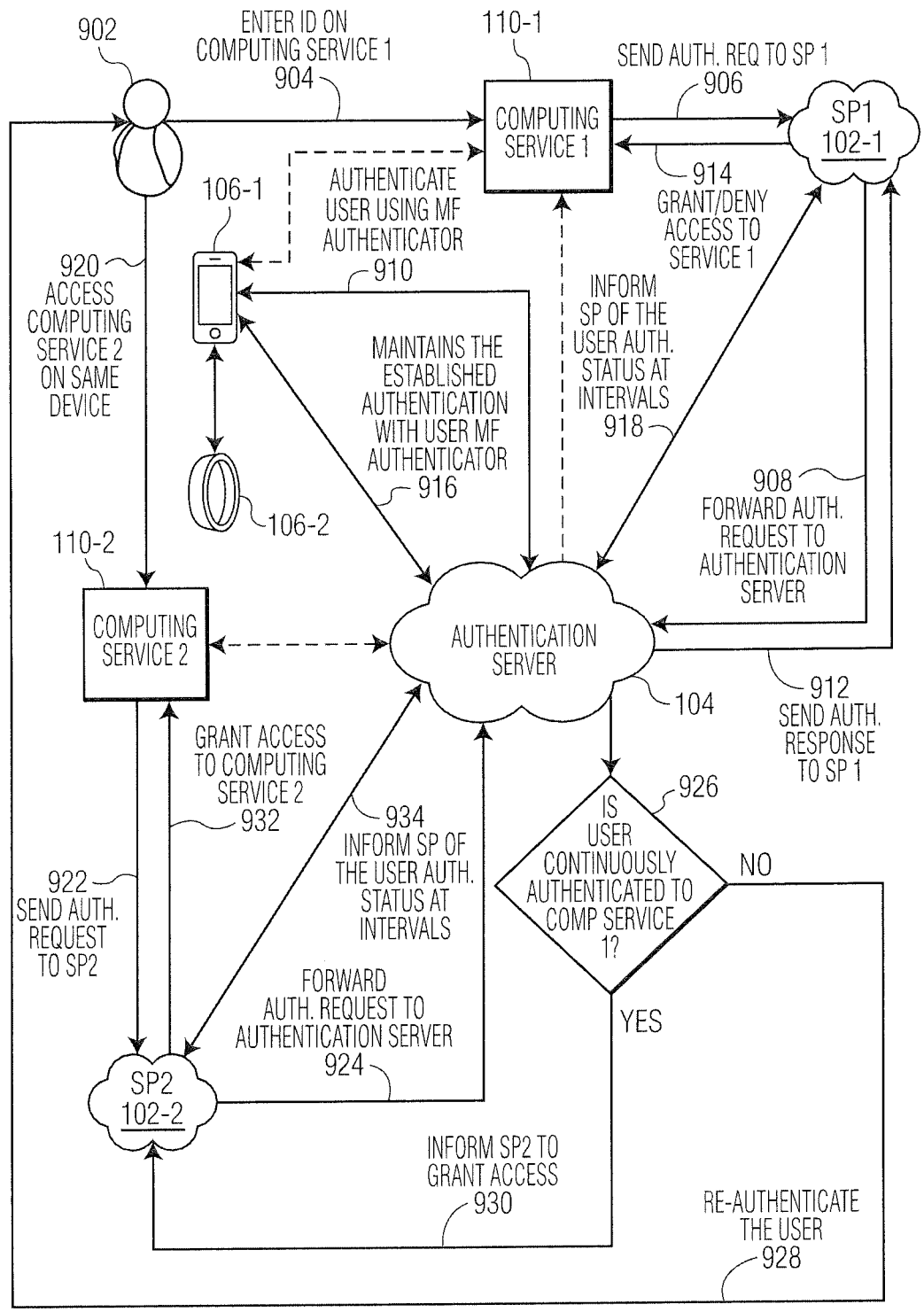
FIG. 9 is a signal flow diagram of an exemplary method for permitting SSO secure access to plural computing services via continuous authentication with two user devices, according to another aspect of the present disclosure.
Figure 10:
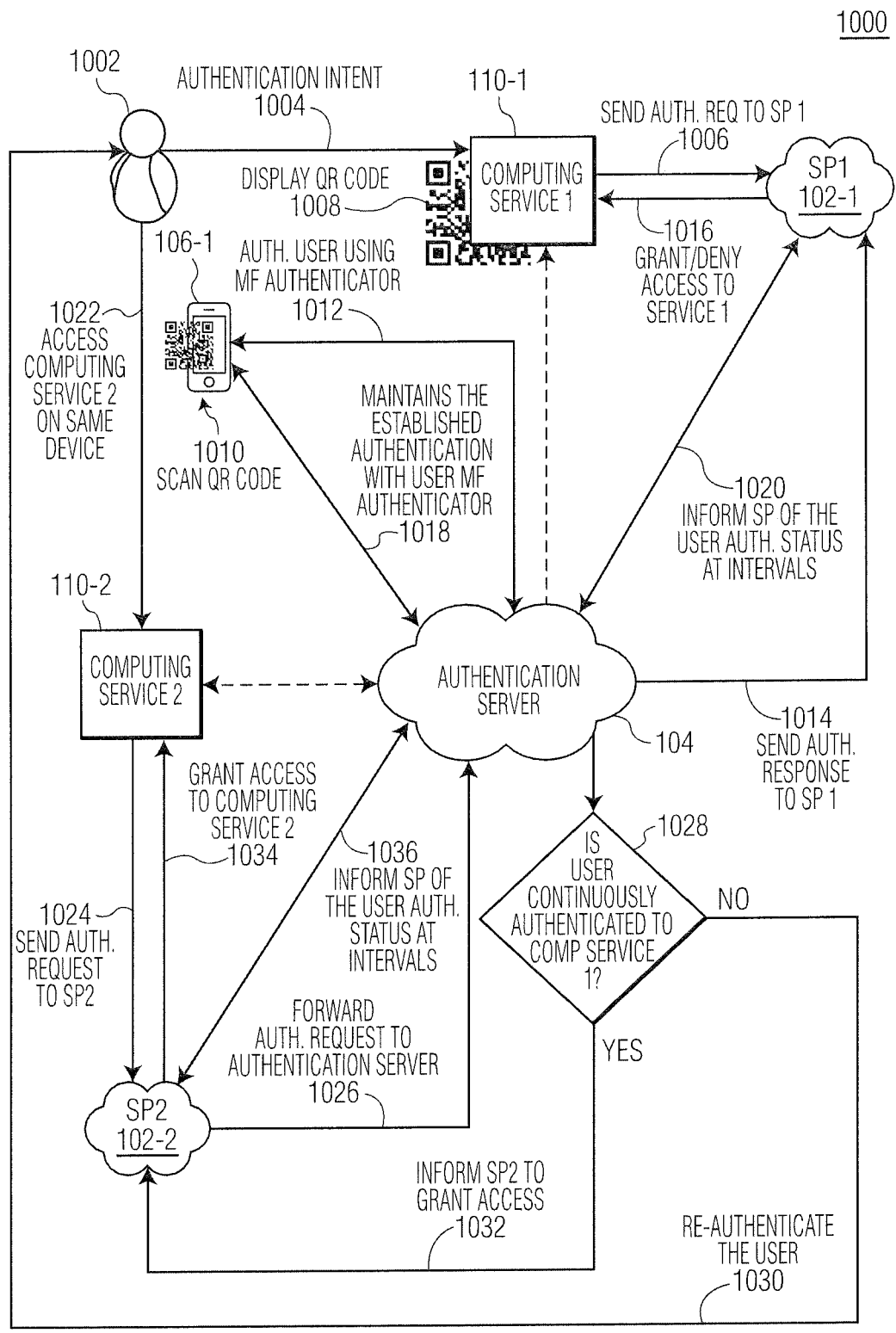
FIG. 10 is a signal flow diagram of an exemplary method for permitting SSO secure access to plural computing services via continuous authentication with one user device, according to another aspect of the present disclosure.
Figure 11:
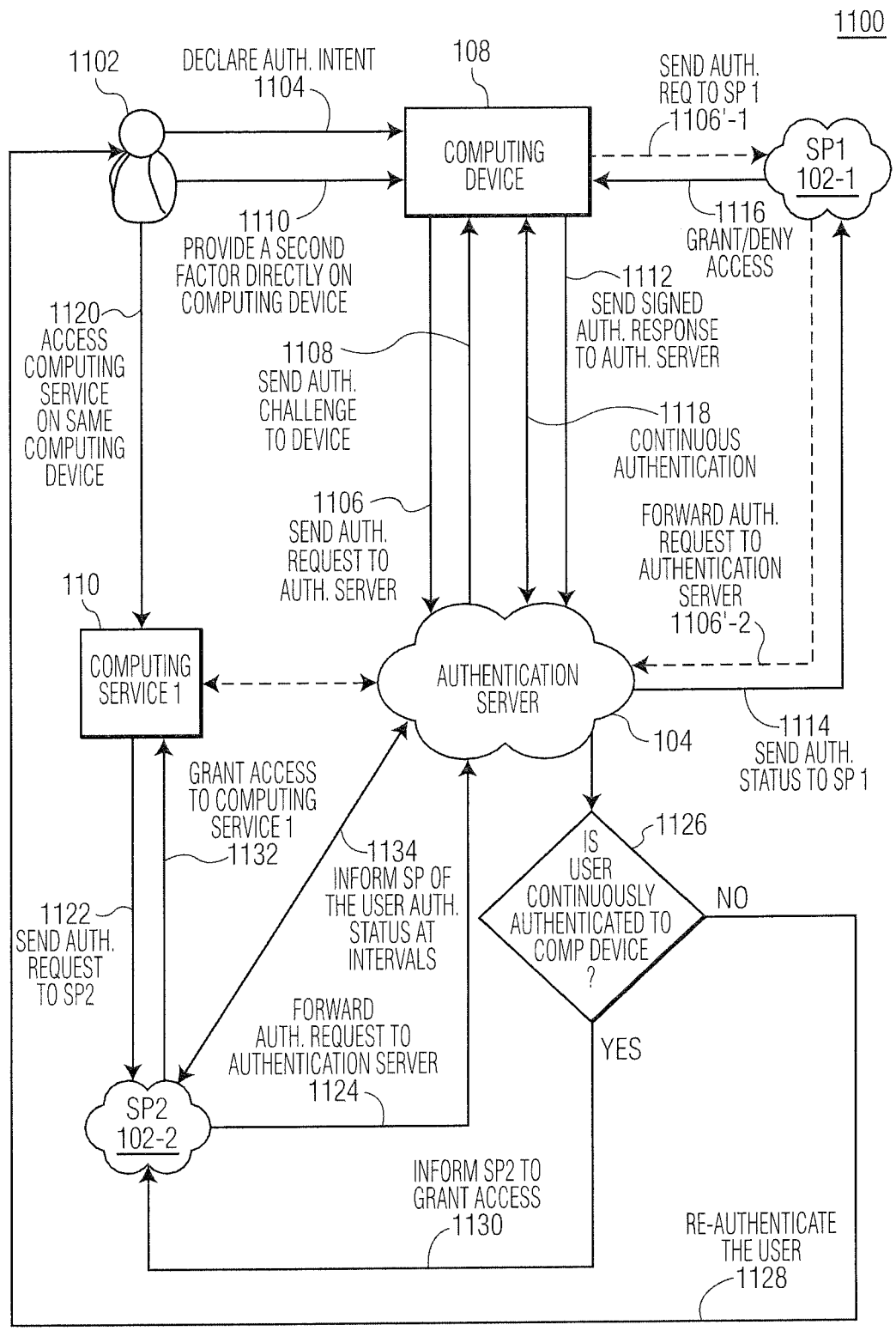
FIG. 11 is a signal flow diagram of an exemplary method for permitting SSO secure access to at least one computing service via continuous authentication with a computing device, according to another aspect of the present disclosure.

Referring next to FIGS. 4-11, signal flow diagrams are shown representing example operations of system 100 including: registration of a user for system 100 (FIG. 4), operation of system 100 for permitting SSO secure access to computing services 110-1 and 110-2 via continuous authentication with user device(s) 106, in general (FIG. 5), operation of system 100 for permitting SSO secure access to computing services 110-1 and 110-2 via continuous authentication with one user device 106-1 (FIG. 6), operation of system 100 for permitting SSO secure access to computing device 108 and computing services 110 via continuous authentication with one user device 106-2 (FIG. 7), operation of system 100 for permitting SSO secure access to computing services 110-1 and 110-2 via continuous authentication with two user devices 106-1 and 106-2 (where user device 106-2 does not include secure internal storage 204) (FIG. 8), operation of system 100 for permitting SSO secure access to computing services 110-1 and 110-2 via continuous authentication with two user devices 106-1 and 106-2 (where user device 106-2 includes secure internal storage 204) (FIG. 9), operation of system 100 for permitting SSO secure access to computing services 110-1 and 110-2 via continuous authentication with one user device 106 via initiation with an out-of-bound communication protocol (FIG. 10), and operation of system 100 for permitting SSO secure access to at least one computing service 110-1 via continuous authentication with computing device 108 (FIG. 11). In FIG. 4-11, it is understood that some of the steps may be performed by system 100 concurrently with other steps or a combination of steps, or may be performed in a different sequence than shown. It will also be understood that the steps shown in FIGS. 4-11 may be implemented by computer program instructions provided to a processor, including, for example, processor 202 executing processing logic and processor 302 executing processing logic 304, respectively.

Figure 4:
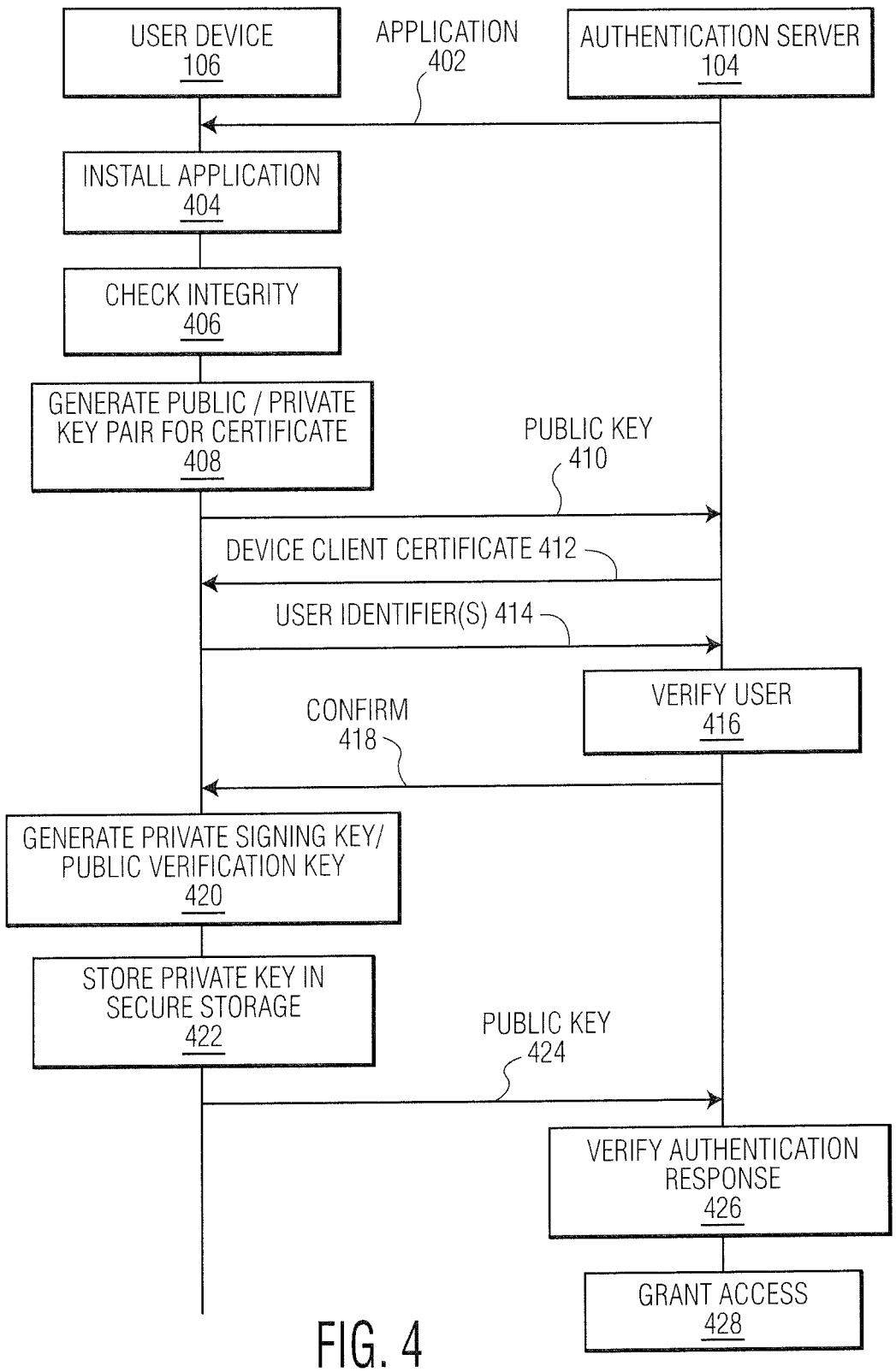
FIG. 4 is a signal flow diagram of an exemplary method of registering a user for the system shown in FIG. 1, according to an aspect of the present disclosure.

Referring to FIG. 4, a signal flow diagram of an example method of registering a user for system 100 is shown. The example registration process may be performed between user device 106 and authentication server 104. At step 402, a CSSO application (also referred to as a one-click application), such as client 124, may be downloaded from authentication server 104. At step 404, the downloaded application may be installed on user device 106. In some examples, some user devices 106, such as specially configured devices (e.g., specialized wearable devices specifically configured for CSSO), the CSSO application may be pre-installed.

At step 406, the CSSO application may, as part of the installation process, check the integrity of user device 106. At step 408, responsive to confirmation of the device integrity, the CSSO application may generate a unique public-private key pair. The key pair (in step 408) may be used for obtaining the device client certificate.

At step 410, the public key component of the key pair (generated at step 408) may be sent to authentication server 104 (e.g., to OAS 112). Responsive to receipt of the public key, at step 412, authentication server 104 may issue a device client certificate to user device 106, and may transmit the device client certificate to user device 106. The device client certificate may be used to establish an authenticated secure channel between user device 106 and authentication server 104. The secure channel may be established using a transport layer security protocol (TLS) certificate-based mutual authentication between OAS 112 and user device 106. In some examples, the device client certificate may serve as an authentication factor. For example, the device client certificate may prove the identity and integrity of user device 106 and/or computing device 108 to authentication server 104.

At step 414, the user may register with authentication server 104 using, for example, an email address, a phone number and/or any other identifiers that may be verifiable. In some examples, the user may register with authentication server 104 via user device 106 (as shown in FIG. 4). In some examples, the user may register with authentication server 104 via electronic device 128. In some examples, the user may register with authentication server 104 via computing device 108.

At step 416, authentication server 104 may verify the user-provided identifier(s) (received in step 414). At step 418, when the user provided identifier is successfully verified, authentication server 104 may send a confirmation message to user device 106. At step 420, responsive to the confirmation message, the CSSO application on user device 106 may generate a unique public-private key pair (a private signing key and a public verification key) for the user. In some examples, the unique public-private key pair may be generated on a computing device such as computing device 108, where the computing device includes secure internal storage (e.g., a trusted platform module (TPM)). At step 422, the private key (and the public key) may be stored securely on secure internal storage 204 of user device 106. The private key may be used to authenticate the user (i.e., digitally sign an authentication response) when the user requests access to computing service 110 or computing device 108. In some examples, the key pair generated at step 420 may serve as a first authentication factor (e.g., a possession factor), and may be further protected with a second authentication factor.

Prior to approving (signing) an authentication request with the private key, the user may provide a second authentication factor (i.e., at least one of knowledge and inherence) on user device 106 (i.e., the MF authenticator device). The second authentication factor may be verified locally by the user authenticator (i.e., by user device 106). When the second authentication factor is verified to be correct, the private signing key (first authentication factor) is retrieved from secure storage 204 to sign the authentication response that is sent to OAS 112. The second authentication factor procedure provides proof of possession and control of user device 106 (the user authenticator device). In some cases, a cryptographic key or other authentication data that is used to generate the authentication response may be established as part of the authentication request. In some examples, the user may provide the second authentication factor (e.g., at least one of knowledge and inherence) directly on computing device 108 (e.g., when computing device 108 includes secure storage, such as a TPM, that can securely generate and protect the key pair generated at step 420). In this example, the second authentication factor may be verified on computing device 108.

At step 424, the corresponding public key component may be sent by user device 106 to OAS 112 of authentication server 104. At step 426, the public key (received at step 424) may be used by OAS 112 of authentication server 104 to verify any authentication response from user device 106 (the user authenticator device). At step 428, authentication server 104 grants access to computing device 108 or computing service 110, only when the authentication response from the user device 106 is successfully verified.

In operation, all communications between OAS 112 and user device 102 may be performed via a secure authenticated channel (e.g., TLS mutual authentication) using the unique device client certificate issued by OAS 112 to the device (at step 412) when the user registers with authentication server 104 to authenticate the device and establish the device identity, integrity and authenticity.

In an example embodiment, to utilize security system 100 for authentication, the user's service provider 102, relying party or the user (e.g., via user device 106, computing device 108 and/or electronic device 128), may enable authentication server 104 as their credential service provider (CSP). When authentication server 104 is enabled as the CSP, the user's service provider 102 (or relying party) and OAS 112 may establish a unique anonymous identifier (AID) that may be used to identify the user and/or user device 106.

An identifier used by the user's service provider 102 to identify the user on their computing service 110 (for example) may not be the same as the AID that OAS 112 and service provider 102 used to identify the user. For example, service provider 102 may use the user's email address to identify the user on the computing service 110 (or computing device 108). Authentication server 104 and service provider 102 may derive the unique AID for the user based on one or more cryptographic algorithms.

When the user enters their email address (a user identifier) on computing service 110, service provider 102 may resolve the entered email address to the user's unique AID, and may then forward the authentication request with the user's unique AID to authentication server 104. Authentication server 104 may use the user's unique AID (received from service provider 102) to locate the user in user database 116, to authenticate the user. Thus, it is possible for the user to have different identifiers (e.g., email address, phone number, user name etc.) with different service providers 102, without authentication server 104 ever needing to access the different user identifiers or any user's personal identifiable information.

In some examples, user device 106 may be registered without a device client certificate. For example, user device 106 may be a third party wearable device that may not support and/or may not allow the provisioning of a device client certificate. In this example, steps 408-412 (generation of the key pair, sending of the public key and sending device client certificate) may be omitted in the registration process. In this example registration process, steps 402-406 may be performed (e.g., downloading the application from authentication server 104, installing the application on user device 106 and checking the integrity of user device 106). Step 406 may then be followed by steps 414-428, as described above.

Figure 5:
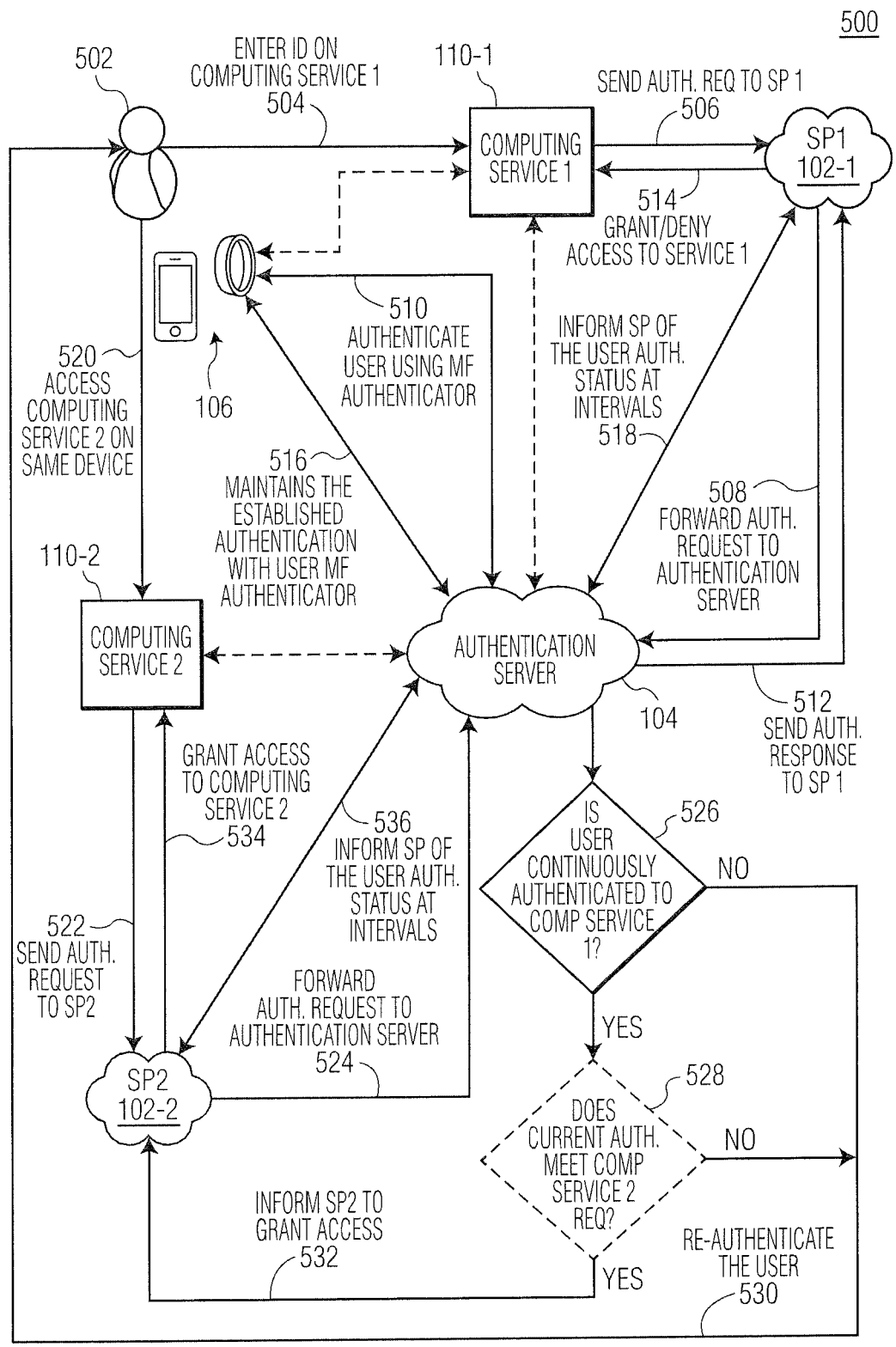
FIG. 5 is a signal flow diagram of an exemplary method for permitting SSO secure access to plural computing services via continuous authentication, according to an aspect of the present disclosure.

Referring to FIG. 5, a signal flow diagram of an example method 500 is shown, illustrating permitting SSO secure access to plural computing services 110 via continuous authentication, according to an aspect of the present disclosure. Steps 504-518 relate to authenticating user 502 to first computing service 110-1 via user device 106 (which, in this example, may be one user device or two user devices (106-1, 106-2)). At step 504, user 502 may login to computing service 110-1 with the (previously installed) authentication application on user device 106. At this time, user device 106 may establish a secure communication channel (e.g., TLS) with authentication server 104 using the device client certificate provisioned during the registration process (see FIG. 4).

At step 506, computing service 110-1 sends a user authentication request to service provider 102-1 (also illustrated in FIG. 5 as SP1, that is associated with computing service 110-1). In some examples, the authentication request may be sent directly to authentication server 104 (as illustrated by the dashed line between computing service 110-1 and authentication server 104) or even to the user MF authenticator (i.e., user device 106).

At step 508, service provider 102-1 may forward the authentication request to authentication server 104. At step 510, authentication server 104 may locate the user using the user identifier created and stored in user database 116 at registration. The user identifier (also referred to below as the unique user identifier) may include the AID, the device client certificate or another user identifier (e.g., an email address, a digital certificate). For example, when the user identifier is an email address, service provider 102-1 may forward the email address to OAS 112, and OAS 112 may use the email address to identify user 502 in user database 116. As another example, where service provider 102-1 and OAS 112 derives an AID for the user, service provider 102-1 may send the AID to OAS 112, and OAS 112 may use the AID to locate user 502 in user database 116. (After locating user 502 in user database 116, OAS 112 may determine the client identifier of user device 106 that corresponds to the user identifier for sending the authentication request to user device 106). Authentication server 104 may then establish a secure TLS communication channel with user device 106. Authentication server 104 (e.g., an MQTT server) may send the authentication request to user device 106. Authentication server 104 may authenticate user 502 using user device 106 (i.e., an MF authenticator). User 502 may be prompted to authenticate with user device 106 (i.e., the MF authenticator). User 502 may unlock user device 106 with a second authentication factor (e.g., knowledge, inherence). The first factor (e.g., a cryptographic key) (provisioned on user device 106 (the user authenticator) during registration) may digitally sign an authentication response using a cryptographic algorithm to prove possession of the authenticator to authentication server 104. In some examples, the cryptographic key or other authentication data that generates the authentication response may be established as part of the authentication request from the computing service 110-1 or service provider 102-1.

In some examples, computing service 110-1 (or computing device 108) may provide an authentication request (e.g., a barcode, a quick response (QR) code, etc.) directly to user device 106. The authentication request provided to (e.g., scanned by) user device 106 may trigger client 124 on user device 106 to authenticate user 502 and send the authentication response to OAS 112 of authentication server 104 (in step 510). The communication between computing service 110-1 and user device 106 is illustrated by the dashed line therebetween. In this example, there may be no authentication request to OAS 112 (step 508) from service provider 102-1. Rather, communication between computing service 110-1 and user device 106 may trigger an authentication response from user device 106 (step 510). A further example is described below with respect to FIG. 10.

Continuing with step 510, the authentication response is sent to authentication server 104 from user device 106 via the established secure communication channel. In some examples, the authentication response may be sent directly to service provider 102-1 via user device 106 (e.g., accessing electronic device 128 (e.g., a PC) connected to Microsoft Active Directory domain. Authentication server 104 may use the corresponding user public verification key component (see FIG. 4) to verify the authentication response. In some examples, the authentication response may be verified by service provider 102-1.

At step 512, authentication server 104 may send the authentication response (from user device 106) to service provider 102-1 (associated with computing service 110-1). For example, OAS 112 of authentication server 104 may verify the authentication response from user device 106, and may provide an indication of the authentication (e.g., an authentication status, such as whether user 502 is successfully authenticated or is not authenticated) to service provider 102-1. In some examples, the response from authentication server 104 to service provider 102-1 may include the response from user device 106. In some examples the response from authentication server 104 to service provider 102-1 may not include the response from user device 106 (e.g., it may include an indication of authentication). At step 514, service provider 102-1 may grant or deny the user access to computing service 110-1, depending on the authentication response received from authentication server 104. At step 516, while computing service 110-1 is being used, authentication server 104 (continually) maintains the established secure communication channel with the user MF authenticator and the user device 106 to ensure that user 502 is continuously authenticated to computing service 110-1. At step 518, authentication server 104 may periodically inform service provider 102-1 of the monitored authentication status.

Next, at steps 520-536, system 100 may authenticate user 502 to another computing service 110-2 (e.g., a web application). At step 520, user 502 may request access on another computing service 110-2 on the same device (e.g., user device 106 or electronic device 128). At step 522, computing service 110-2 may send an authentication request to service provider 102-2 (also illustrated in FIG. 5 as SP2, that is associated with computing service 110-2). In some examples, the authentication request may be sent from computing service 110-2 directly to authentication server 104. At step 524, service provider 102-2 may forward the authentication request to authentication server 104. In some examples, service provider 102-2 may handle the authentication request, where service provider 102-2 can confirm the existing continuous authentication, without contacting authentication server 104 (for example, when computing service 110-1 and computing service 110-2 belong to the same service provider 102).

At step 526, authentication server 104 may determine whether user 502 is continuously authenticated on computing service 110-1 based on user device 106 communicating with authentication server 104 within a pre-defined time limit (e.g., 3 seconds). When user device 106 is continuously authenticated, step 526 proceeds to optional step 528. At optional step 528, authentication server 104 may determine whether the current authentication meets computing service 110-2 requirements. When, at optional step 528, it is determined that the computing requirements are met, optional step 528 proceeds to step 532.

When, at step 526 or optional step 528, authentication server 104 determines that user device 106 is not continuously authenticated, step 526 (step 528) proceeds to step 530, and system 100 requests re-authentication of user 502.

At step 532, authentication server 104 informs service provider 102-2 (associated with subsequent computing service 110-2) to grant user 502 access to computing service 110-2. At step 534, service provider 102-2 grants access to computing service 110-2. At step 536, while computing service 110-2 is being used, authentication server 104 maintains the established secure communication channel with the user device 106 (i.e., the user MF authenticator) to ensure that user 502 is continuously authenticated to computing service 110-2.

The above process may be repeated when user 502 wants to access another computing service 110 while the continuous authentication is active (maintained). User 502 may decide to terminate the established authentication via their MF authenticator (user device 106), by disconnecting with the computing service 110. To regain access to computing services 110, user 502 needs to be re-authenticated by authentication server 104. In some optional examples, when the authentication requirements of subsequent computing services 110 do not meet with an authentication level used to authenticate the active computing service 110, user 502 may also be re-authenticated (steps 528 and 530).

Figure 6:
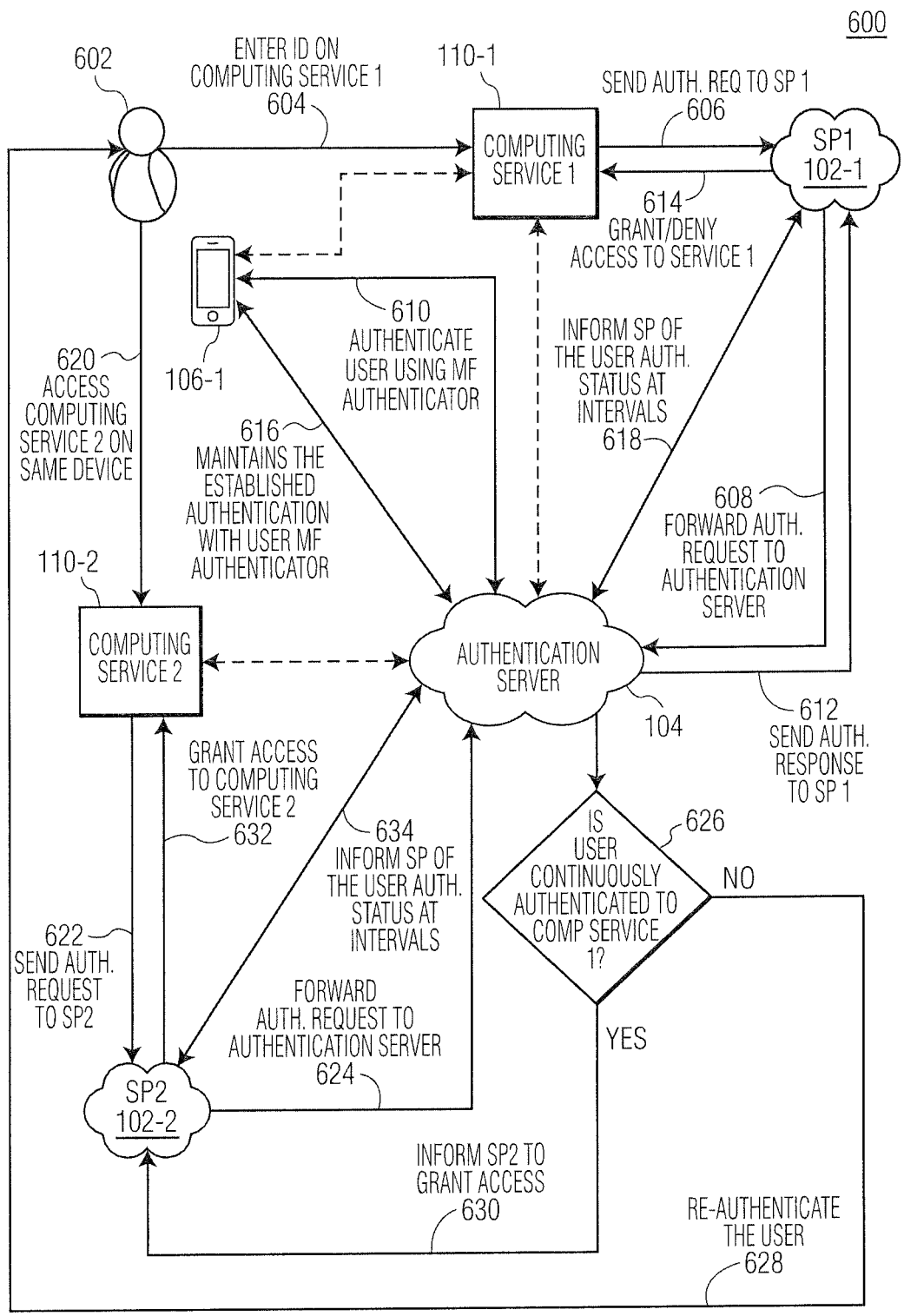
FIG. 6 is a signal flow diagram of an exemplary method for permitting SSO secure access to plural computing services via continuous authentication with one user device, according to another aspect of the present disclosure.

Referring to FIG. 6, a signal flow diagram of an example method 600 is shown, illustrating permitting SSO secure access to plural computing services 110 via continuous authentication with one user device 106-1 (e.g., a smartphone), according to an aspect of the present disclosure. Steps 604-618 relate to authenticating user 602 to first computing service 110-1 via user device 106-1. At step 604, user 602 may initiate login to computing service 110-1 (e.g., a web application, a mobile application, etc.) via an authentication application on their computing device (e.g., electronic device 128, user device 106-1 (such as a mobile phone), etc.).

At step 606, computing service 110-1 may send a user authentication request to the service provider 102-1 (e.g., the web application owner) that is associated with computing service 110-1. In some examples, the authentication request may be sent directly to authentication server 104.

At step 608, service provider 102-1 may forward the authentication request to authentication server 104. At step 610, authentication server 104 may locate the user using the user identifier created and stored in user database 116 at registration. Authentication server 104 may then establish a secure TLS communication channel with user device 106-1. Authentication server 104 (e.g., an MQTT server) may send the authentication request to user device 106-1. Authentication server 104 may authenticate user 602 using user device 106-1 (i.e., an MF authenticator). User 602 may be prompted to authenticate with user device 106-1 (i.e., the MF authenticator). User 602 may provide with a second authentication factor (e.g., knowledge, inherence) on user device 106-1. The first factor (e.g., a private signing cryptographic key) (provisioned on user device 106-1 (the user authenticator) during registration) may digitally sign an authentication response using a cryptographic algorithm to prove possession of user device 106-1 to authentication server 104. In some examples, the cryptographic key or other authentication data that generates the authentication response may be established as part of the authentication request from the computing service 110-1 or service provider 102-1.

Continuing with step 610, the authentication response is sent to authentication server 104 from user device 106-1 via the established secure communication channel. Authentication server 104 may use the corresponding user public verification key component to verify the authentication response.

At step 612, authentication server 104 may send the authentication response (from user device 106-1) to service provider 102-1 (associated with computing service 110-1). As discussed above, in some examples, the response from authentication server 104 to service provider 102-1 may include the response from user device 106-1. In some examples the response from authentication server 104 to service provider 102-1 may not include the response from user device 106-1 (e.g., it may include an indication of authentication). At step 614, service provider 102-1 may grant or deny the user access to computing service 110-1, depending on the authentication response received from authentication server 104. At step 616, while computing service 110-1 is being used, authentication server 104 (continually) maintains the established secure communication channel with the user device 106-1 (the MF authenticator) to ensure that user 602 is continuously authenticated to computing service 110-1. At step 618, authentication server 104 may periodically inform service provider 102-1 of the monitored authentication status.

Next, at steps 620-634, system 100 may authenticate user 602 to another computing service 110-2 (e.g., a web application). At step 620, user 602 may request access on another computing service 110-2 (e.g., a web application) on the same device (e.g., user device 106-1 or electronic device 128). In some examples, computing service 110-2 may use a different or a same unique user identifier (e.g., an email address, phone number, username, the AID (derived for user 602 at registration between service provider 102 and OAS 112), etc.) as computing service 110-1. In other words, the unique user identifier represents information that service provider 102 (e.g., 102-1 or 102-2) may use to identify user 602. In some examples, service provider 102 (e.g., 102-1 or 102-2) may pass the unique user identifier (e.g., such as an email address) directly to authentication server 104. In some examples, service provider 102 (e.g., 102-1 or 102-2) may resolve the unique AID for user 602 from the user identifier and pass the AID to authentication server 104. At step 622, computing service 110-2 may send an authentication request to service provider 102-2 (associated with computing service 110-2). At step 624, service provider 102-2 may forward the authentication request to authentication server 104 with the corresponding unique user identifier. Authentication server 104 may locate user 602 in user database 116 via the unique user identifier.

At step 626, authentication server 104 may determine whether user 602 is continuously authenticated on computing service 110-1 based on user device 106-1 communicating with authentication server 104 within a pre-defined time limit (e.g., 3 seconds). When user device 106-1 is continuously authenticated, step 626 proceeds to step 630.

When, at step 626, authentication server 104 determines that user device 106-1 is not continuously authenticated, step 626 proceeds to step 628, and system 100 requests re-authentication of user 602.

At step 630, authentication server 104 informs service provider 102-2 (associated with subsequent computing service 110-2) to grant user 602 access to computing service 110-2. At step 632, service provider 102-2 grants access to computing service 110-2. At step 634, while computing service 110-2 is being used, authentication server 104 maintains the established secure communication channel with the user device 106-1 (i.e., the user MF authenticator) to ensure that user 602 is continuously authenticated to computing service 110-2.

The above process 600 may be repeated when user 602 wants to access another computing service 110 while the continuous authentication is active. User 602 may decide to terminate the established authentication via user device 102-1 (e.g., a smartphone), by disconnecting with computing service 110-2. To regain access to computing services 110, user 602 needs to be re-authenticated by authentication server 104. In some optional examples, when the authentication requirements of subsequent computing services 110 do not meet with an authentication level used to authenticate the active computing service 110, user 602 may also be re-authenticated. In the example process 600, user device 106-1 (e.g., a smartphone) may be configured to handle the cryptographic operations to generate the authentication response.

Figure 7:
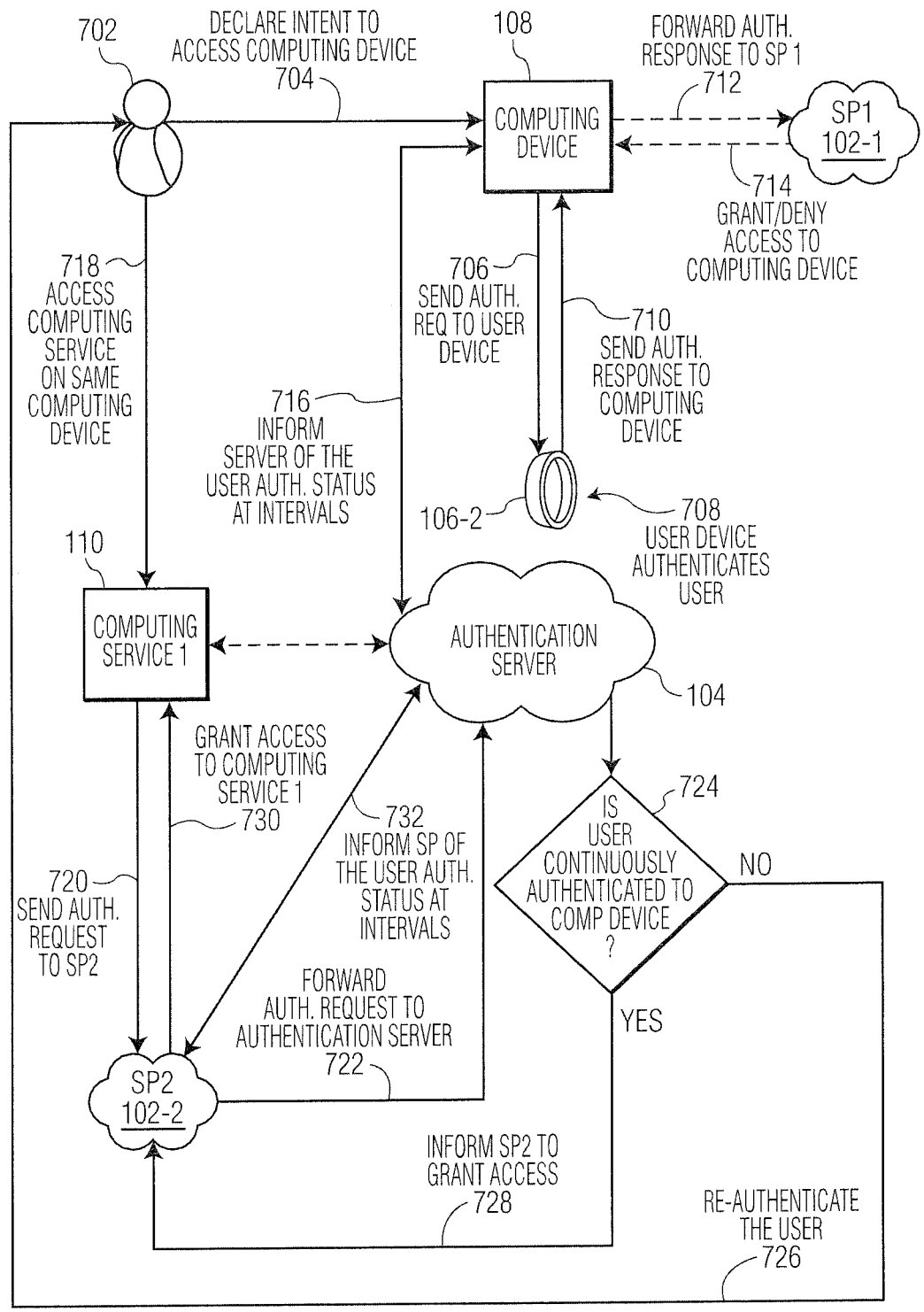
FIG. 7 is a signal flow diagram of an exemplary method for permitting SSO secure access to a computing device and a computing service via continuous authentication with a wearable device, according to another aspect of the present disclosure.

Referring to FIG. 7, a signal flow diagram of an example method 700 is shown, illustrating permitting SSO secure access to computing device 108 and computing service 110 via continuous authentication with a wearable user device 106-2, according to an aspect of the present disclosure. In this example, user device 106-2 represents a specially configured wearable device having secure internal storage 204, which may be configured to authenticate user 702. Steps 704-716 relate to authenticating user 702 to computing device 108 (e.g., a PC) via wearable user device 106-2.

At step 704, user 702 may declare an intent to access computing device 108 (where an authentication application for system 100 is installed on computing device 108 and pre-installed on user device 106-2). At step 706, user device 106-2 and computing device 108 establish a secure communication channel (e.g., via TLS, Bluetooth, NFC, UWB), and computing device 108 sends a user authentication request to user device 106-2. In some examples, the authentication request may be sent directly to authentication server 104.

At step 708, user device 106-2 may authenticate user 702. User 702 may provide a second authentication factor (e.g., knowledge, inherence) directly on user device 106-2, to activate user device 106-2. In some examples, the second factor maybe provided indirectly to user device 106-2 via computing device 108. The first factor (e.g., a private signing cryptographic key), provisioned on user device 106-2, may digitally sign an authentication response using a cryptographic algorithm, to prove possession of user device 106-2 to computing device 108 (or service provider 102-1). In some examples, the cryptographic key (or other authentication data) that generates the authentication response may be established as part of the authentication request from computing device 108. At step 710, the generated authentication response is sent from user device 106-2 to computing device 108 via the established secure communication channel. Computing device 108 may use the corresponding user public verification key to verify the authentication response.

At optional step 712, computing device 108 may forward the authentication response to service provider 102-1 (e.g., a Microsoft Active Directory). At optional step 714, service provider 102-1 may verify the authentication response with the user's public verification key, and grant/deny access to the computing device, depending on the authentication result.

At step 716, computing device 108 may establish a secure communication channel with authentication server 104, and may inform authentication server 104 of the user/device authentication status. In some examples, the secure communication channel between authentication server and computing device 108 may be established prior to the user authentication. Further, at step 716, while computing device 108 is being used, user device 106-2 continuously authenticates user computing device 108. The computing device, in turn, maintains the established secure communication channel with authentication server 104 to ensure authentication server 104 that user 702 is continuously authenticated to computing device 108.

Next, at steps 718-732, system 100 may authenticate user 702 to computing service 110 (e.g., a web application, a remote device). At step 718, user 702 may request access on computing service 110 (e.g., a web application, a remote device) on the same device (e.g., user device 106-2 or electronic device 128).

In some optional examples, computing service 110 may send the authentication request to service provider 102-2 (associated with computing service 110) (e.g., a Microsoft Active Directory). Service provider 102-2 may check the user authentication status (for example, service provider 102-2 may detect that a user is continuously authenticated with user device 106-2). Service provider 102-2 may grant user 702 access to computing service 110 (or a remote device). In some examples, this may represent a case in an enterprise environment where both computing device 108 and computing service 110 belong to the same service provider 102.

At step 720, computing service 110 may send the authentication request to service provider 102-2. At step 722, service provider 102-2 may forward the authentication request to authentication server 104 with a corresponding unique user identifier. Authentication server 104 may locate user 702 in user database 116 via the unique user identifier. In some examples, steps 720 and 722 may occur in cases where computing device 108 and computing service 110 belong to different service providers 102-1, 102-2.

At step 724, authentication server 104 may determine whether user 702 is continuously authenticated on computing device 108 (that access was requested from). When computing device 108 is continuously authenticated, step 724 proceeds to step 728.

When, at step 724, authentication server 104 determines that computing device 108 is not continuously authenticated, step 724 proceeds to step 726, and system 100 requests re-authentication of user 702.

At step 728, authentication server 104 informs service provider 102-2 to grant user 702 access to computing service 110. At step 730, service provider 102-2 grants access to computing service 110. At step 732, while computing service 110 is being used, user device 106-2 continuously authenticates the user computing device 108. Computing device 108, in turn, maintains the established secure communication channel with authentication server 104 to ensure authentication server 104 that user 702 is continuously authenticated to computing device 108.

The above process 700 may be repeated if user 702 wants to access another computing service 110 (or remote device) while the continuous authentication is active. User 702 may decide to terminate the established authentication via user device 106-2 or computing device 108, by disconnecting with computing device 108. To regain access to computing services 110, the user needs to be re-authenticated by authentication server 104. In the example process 700, user device 106-2 (e.g., a specially configured wearable device) may be configured to handle the cryptographic operations to generate the authentication response.

Figure 8:
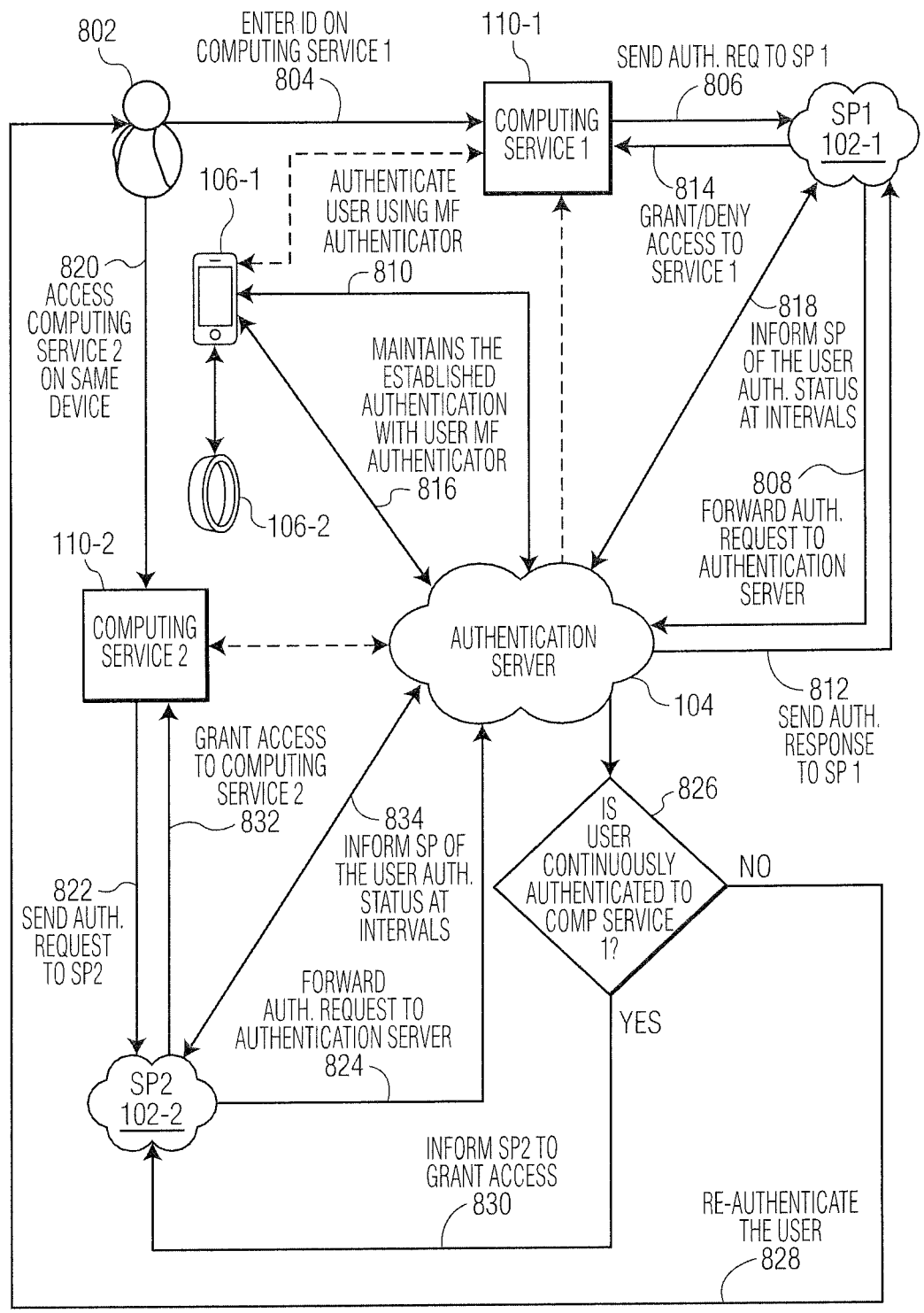
FIG. 8 is a signal flow diagram of an exemplary method for permitting SSO secure access to plural computing services via continuous authentication with two user devices, according to another aspect of the present disclosure.

Referring to FIG. 8, a signal flow diagram of an example method 800 is shown, illustrating permitting SSO secure access to plural computing services 110 via continuous authentication with two user devices 106-1, 106-2, according to an aspect of the present disclosure. In this example, user device 106-1 represents a mobile phone have secure internal storage 204 and user device 106-2 represents a third party wearable device that does not include a secure internal storage.

Steps 804-818 relate to authenticating user 802 to first computing service 110-1 via user devices 106-1, 106-2. At step 804, user 802 may login to computing service 110-1 (e.g., a web application, a mobile application, PC, etc.) via an authentication application on their computing device (e.g., electronic device 128, user device 106-1, etc.).

At step 806, computing service 110-1 may send a user authentication request to the service provider 102-1 (e.g., the web application owner) that is associated with computing service 110-1. In some examples, the authentication request may be sent directly to authentication server 104. In some examples, the authentication request may be sent directly to user authenticators (e.g., user device 106-1) without contacting service provider 102-1 (e.g., using the authenticators to access a physical device such as a PC, door, printer, scanner, etc.).

At step 808, service provider 102-1 may forward the authentication request to authentication server 104. At step 810, authentication server 104 may locate the user using the user identifier created and stored in user database 116 at registration. Authentication server 104 may then establish a secure TLS communication channel with user device 106-1. Authentication server 104 (e.g., an MQTT server) may send the authentication request to user device 106-1. Authentication server 104 may authenticate user 802 using a combination of user device 106-1 and user device 106-2 (i.e., an MF authenticator).

User 802 may be prompted to authenticate with user device 106-1. User 802 may unlock user device 106-1 with a second authentication factor (e.g., knowledge, inherence). An authentication application on user device 106-1 may check for the presence of wearable user device 106-2. In some examples, wearable user device 106-2 may provide some information to the authentication application on user device 106-1. When the presence of user device 106-2 is detected, the first factor (e.g., a private signing cryptographic key) (provisioned on user device 106-1 during registration) may digitally sign an authentication response using a cryptographic algorithm to prove possession of user device 106-1 and presence of user device 106-2 to authentication server 104. In some examples, the cryptographic key or other authentication data that generates the authentication response may be established as part of the authentication request from the computing service 110-1 or service provider 102-1.

Continuing with step 810, the authentication response is sent to authentication server 104 from user device 106-1 via the established secure communication channel. Authentication server 104 may use the corresponding user public verification key component to verify the authentication response. In some examples, the authentication response may be sent directly to computing service 110-1 (e.g., accessing a PC, printer, door etc.). In some examples, the authentication response may be verified by service provider 102-1 (e.g., accessing a PC that is connected to Microsoft Active Directory domain).

At step 812, authentication server 104 may send the authentication response (from user device 106-1) to service provider 102-1 (associated with computing service 110-1). At step 814, service provider 102-1 may grant or deny the user access to computing service 110-1, depending on the authentication response received from authentication server 104. At step 816, while computing service 110-1 is being used, authentication server 104 (continually) maintains the established secure communication channel with the user device 106-1. User device 106-1, in turn, ensures that user device 106-2 (e.g., a third party wearable device) is present. In some examples, user device 106-1 and/or user device 106-2 may communicate directly with computing service 110-1 (e.g., when a PC is accessed with this method, user device 106-1 and/or user device 106-2 may be continuously authenticated to the PC and the PC, in turn, may communicates with authentication server 104). At step 818, authentication server 104 may periodically inform service provider 102-1 of the monitored authentication status.

Next, at steps 820-834, system 100 may authenticate user 802 to another computing service 110-2 (e.g., a web application). At step 820, user 802 may request access on another computing service 110-2 (e.g., a web application) on the same device (e.g., user device 106-1 or electronic device 128). In some examples, computing service 110-2 may use a different or a same unique user identifier as computing service 110-1. At step 822, computing service 110-2 may send an authentication request to service provider 102-2 (associated with computing service 110-2). At step 824, service provider 102-2 may forward the authentication request to authentication server 104 with the corresponding unique user identifier. Authentication server 104 may locate user 802 in user database 116 via the unique user identifier. In some examples, the authentication request may be sent directly to authentication server 104 from computing service 110-2. In some examples, service provider 102-2 may not forward the authentication request to authentication server 104 (e.g., when computing service 110-1 is a physical device, service provider 102-2 may confirm the continuous authentication with the authenticators (e.g., user device 106-2).

At step 826, authentication server 104 may determine whether user 802 is continuously authenticated on computing service 110-1 based on user device 106-1 communicating with authentication server 104 within a pre-defined time limit (e.g., 3 seconds). When user device 106-1 is continuously authenticated, step 826 proceeds to step 830.

When, at step 826, authentication server 104 determines that user device 106-1 is not continuously authenticated, step 826 proceeds to step 828, and system 100 requests re-authentication of user 802.

At step 830, authentication server 104 informs service provider 102-2 (associated with subsequent computing service 110-2) to grant user 802 access to computing service 110-2. At step 832, service provider 102-2 grants access to computing service 110-2. At step 834, while computing service 110-2 is being used, authentication server 104 maintains the established secure communication channel with the user device 106-1 (i.e., the user MF authenticator), and user device 106-1, in turn, ensures that user device 106-2 is present.

The above process 800 may be repeated when user 802 wants to access another computing service 110 while the continuous authentication is active. User 802 may decide to terminate the established authentication via user device 106-1, by disconnecting with computing service 110-2 or with user device 106-2 (i.e., removing user device 106-2 from a detectable proximity of user device 106-1). To regain access to the computing services 100, user 802 needs have to be re-authenticated by authentication server 104. In some optional examples, when the authentication requirements of subsequent computing services 110 do not meet with an authentication level used to authenticate the active computing service 110, user 802 may also be re-authenticated. In the example process 800, user device 106-1 (e.g., a smartphone) may be configured to handle the cryptographic operations to generate the authentication response. User device 106-2 may serve as an additional factor of possession for the MF authentication. In some examples, user device 106-1 may obtain some input from user device 106-2 to complete the cryptographic operations.

Referring to FIG. 9, a signal flow diagram of an example method 900 is shown, illustrating permitting SSO secure access to plural computing services 110 via continuous authentication with two user devices 106-1, 106-2, according to an aspect of the present disclosure. In this example, user device 106-1 represents a mobile phone have secure internal storage 204 and user device 106-2 represents a specially configured wearable device that includes secure internal storage 204. In this example, wearable user device 106-2 may not be configured to communicate with computing service(s) 110 directly (e.g., accessing a banking web application on a public computer).

Steps 904-918 relate to authenticating user 902 to first computing service 110-1 via user devices 106-1, 106-2. At step 904, user 902 may login to computing service 110-1 (e.g., a web application) via an authentication application on their computing device (e.g., electronic device 128, user device 106-1, etc.).

At step 906, computing service 110-1 may send a user authentication request to the service provider 102-1 associated with computing service 110-1. In some examples, the authentication request may be sent directly to authentication server 104.

At step 908, service provider 102-1 may forward the authentication request to authentication server 104. At step 910, authentication server 104 may locate user 902 using the user identifier created and stored in user database 116 at registration. Authentication server 104 may then establish a secure TLS communication channel with user device 106-1 (the user authenticator). Authentication server 104 (e.g., an MQTT server) may send the authentication request to user device 106-1. Authentication server 104 may authenticate user 902 using a combination of user device 106-1 and user device 106-2 (i.e., an MF authenticator).

User 902 may be prompted to authenticate with wearable user device 106-2. User 902 may unlock user device 106-1 with a second authentication factor (e.g., knowledge, inherence), and user device 106-1 (e.g., a smartphone) may establish a secure communication channel with wearable user device 106-2 (e.g., using a TLS protocol, NFC, UWB, etc.). An authentication application on user device 106-1 may direct the authentication request to wearable user device 106-2 via any suitable wireless communication means (e.g., Bluetooth, NFC, UWB, etc.) using the established secure channel. The first factor (e.g., a private signing cryptographic key) (provisioned on user device 106-2 during registration) may digitally sign an authentication response using a cryptographic algorithm to prove possession of wearable user device 106-2 to authentication server 104. In some examples, the cryptographic key that generates the authentication response may be established as part of the authentication request from the computing service 110-1 or service provider 102-1.

Continuing with step 910, the authentication response is sent to authentication server 104 from user device 106-1 via the established secure communication channel. Authentication server 104 may use the corresponding user public verification key component to verify the authentication response.

At step 912, authentication server 104 may send the authentication response (from user device 106-1) to service provider 102-1 (associated with computing service 110-1). At step 914, service provider 102-1 may grant or deny user 902 access to computing service 110-1, depending on the authentication response received from authentication server 104. At step 916, while computing service 110-1 is being used, authentication server 104 (continually) maintains the established secure communication channel with the user device 106-1. User device 106-1, in turn, ensures continuous authentication with wearable user device 106-2. At step 918, authentication server 104 may periodically inform service provider 102-1 of the monitored authentication status.

Next, at steps 920-934, system 100 may authenticate user 902 to another computing service 110-2 (e.g., a web application). At step 920, user 902 may request access on another computing service 110-2 (e.g., a web application) on the same device (e.g., user device 106-1 or electronic device 128). In some examples, computing service 110-2 may use a different or a same unique user identifier as computing service 110-1. At step 922, computing service 110-2 may send an authentication request to service provider 102-2 (associated with computing service 110-2). At step 924, service provider 102-2 may forward the authentication request to authentication server 104 with a corresponding unique user identifier. Authentication server 104 may locate user 902 in user database 116 via the unique user identifier. In some examples, the authentication request may be sent directly to authentication server 104 from computing service 110-2. In some examples, service provider 102-2 may not forward the authentication request to authentication server 104 (e.g., where service provider 102-2 can confirm the continuous authentication status).

At step 926, authentication server 104 may determine whether user 902 is continuously authenticated on computing service 110-1 based on user device 106-1 communicating with authentication server 104 within a pre-defined time limit (e.g., 3 seconds). When user device 106-1 is continuously authenticated, step 926 proceeds to step 930.

When, at step 926, authentication server 104 determines that user device 106-1 is not continuously authenticated, step 926 proceeds to step 928, and system 100 requests re-authentication of user 902.

At step 930, authentication server 104 may inform service provider 102-2 (associated with subsequent computing service 110-2) to grant user 902 access to computing service 110-2. At step 932, service provider 102-2 may grant access to computing service 110-2. At step 934, while computing service 110-2 is being used, authentication server 104 maintains the established secure communication channel with wearable user device 106-2 via user device 106-1, and periodically informs service provider 102-2 of the monitored authentication state.

The above process 900 may be repeated when user 902 wants to access another computing service 110 while the continuous authentication is active. User 902 may decide to terminate the established authentication via user device 106-1, by disconnecting with computing service 110-2 or with user device 106-2 (i.e., removing user device 106-2 from a detectable proximity of user device 106-1). The authentication may also end when wearable user device 106-2 is deactivated. To regain access to the computing services 100, user 902 needs to be re-authenticated by authentication server 104. In some optional examples, when the authentication requirements of subsequent computing services 110 do not meet with an authentication level used to authenticate the active computing service 110, user 902 may also be re-authenticated. In the example process 900, user device 106-1 (e.g., a smartphone) may provide the secure communication channel to authentication server 104, and wearable user device 102-2 may be configured to handle the cryptographic operations to generate the authentication response.

Referring to FIG. 10, a signal flow diagram of an example method 1000 is shown, illustrating permitting SSO secure access to plural computing services 110 via continuous authentication with one user device 106-1 that is initiated via an out-of-bound communication protocol (e.g., a QR code, Bluetooth, NFC, etc.), according to an aspect of the present disclosure. In the example shown in FIG. 10, service provider 102-1 does not need to send an access request to authentication server 104. Instead, service provider 102-1 may, for example, generate a QR code and display the QR code (or use another out-of-bound protocol) to user 1002 via computing service 110-1 (or computing device 108). User 1002 may scan the QR Code with user device 106-1 (e.g., a smartphone). Responsive to scanning of the QR Code, user 1002 is prompted to authenticate via an MF authenticator. An authentication response is then sent from user device 106-1 to authentication server 104. Authentication server 104 may verify the authentication response and inform service provider 102-1 to grant/deny access to the user.

Steps 1004-1020 relate to authenticating user 1002 to first computing service 110-1 via user device 106-1. At step 1004, user 1002 may declare an authentication intent to computing service 110-1 (e.g., a web application, a mobile application, etc.) via an authentication application on their computing device (e.g., electronic device 128, user device 106-1 (such as a mobile phone), etc.).

At step 1006, computing service 110-1 may send a user authentication request to service provider 102-1 (e.g., the web application owner) that is associated with computing service 110-1. At step 1008, service provider 102-1 may generate a login challenge and display the challenge as, for example, a QR code on computing service 110-1. At step 1010, user 1002 may scan the QR code with user device 106-1.

At step 1012, authentication server 104 may authenticate user 1002 using user device 106-1 (i.e., an MF authenticator). User 1002 may be prompted to authenticate with user device 106-1 via the MF authenticator. User 1002 may provide an additional authentication factor (e.g., knowledge, inherence) on user device 106-1. User device 106-1 may also establish a secure communication channel with authentication server 104. The authentication response is then sent, at step 1012, to authentication server 104 from user device 106-1, via the secure communication channel.

At step 1014, authentication server 104 may send the authentication response (from user device 106-1) to service provider 102-1 (associated with computing service 110-1). For example, OAS 112 of authentication server 104 may verify the authentication response and send an indication of authentication to service provider 102-1. As discussed above, in some examples, the response from authentication server 104 to service provider 102-1 may include the response from user device 106-1. In some examples the response from authentication server 104 to service provider 102-1 may not include the response from user device 106-1 (e.g., it may include an indication of authentication). At step 1016, service provider 102-1 may grant or deny the user access to computing service 110-1, depending on the authentication response (indication) received from authentication server 104. At step 1018, while computing service 110-1 is being used, authentication server 104 (continually) maintains the continuous authentication with user device 106-1 (the MF authenticator), via the established secure communication channel, to ensure that user 1002 is continuously authenticated to computing service 110-1. At step 1020, authentication server 104 may periodically inform service provider 102-1 of the monitored authentication status.

Next, at steps 1022-1036, system 100 may authenticate user 1002 to another computing service 110-2 (e.g., a web application). At step 1022, user 1002 may request access on another computing service 110-2 (e.g., a web application) on the same device (e.g., user device 106-1 or electronic device 128). In some examples, computing service 110-2 may use a different or a same unique user identifier (e.g., an email address, phone number, username, the AID (derived for user 1002 at registration between service provider 102 and OAS 112), etc.) as computing service 110-1. In other words, the unique user identifier represents information that service provider 102 (e.g., 102-1 or 102-2) may use to identify user 1002. In some examples, service provider 102 (e.g., 102-1 or 102-2) may pass the unique user identifier (e.g., such as an email address) directly to authentication server 104. In some examples, service provider 102 (e.g., 102-1 or 102-2) may resolve the unique AID for user 1002 from the user identifier and pass the AID to authentication server 104. At step 1024, computing service 110-2 may send an authentication request to service provider 102-2 (associated with computing service 110-2). At step 1026, service provider 102-2 may forward the authentication request to authentication server 104 with the corresponding unique user identifier. Authentication server 104 may locate user 1002 in user database 116 via the unique user identifier. In some examples, the authentication request may be sent directly to authentication server 104 from computing service 110-2.

At step 1028, authentication server 104 may determine whether user 1002 is continuously authenticated on computing service 110-1 based on user device 106-1 communicating with authentication server 104 within a pre-defined time limit (e.g., 3 seconds). When user device 106-1 is continuously authenticated, step 1028 proceeds to step 1032.

When, at step 1028, authentication server 104 determines that user device 106-1 is not continuously authenticated, step 1028 proceeds to step 1030, and system 100 requests re-authentication of user 1002.

At step 1032, authentication server 104 informs service provider 102-2 (associated with subsequent computing service 110-2) to grant user 1002 access to computing service 110-2. At step 1034, service provider 102-2 grants access to computing service 110-2. At step 1036, while computing service 110-2 is being used, authentication server 104 maintains the continuous authentication with user device 106-1 (i.e., the user MF authenticator), via the secure communication channel, to ensure that user 1002 is continuously authenticated to computing service 110-2.

The above process 1000 may be repeated when user 1002 wants to access another computing service 110 while the continuous authentication is active. User 1002 may decide to terminate the established authentication via user device 102-1 (e.g., a smartphone), by disconnecting with computing service 110-2. To regain access to computing services 110, user 1002 needs to be re-authenticated by authentication server 104. In some optional examples, when the authentication requirements of subsequent computing services 110 do not meet with an authentication level used to authenticate the active computing service 110, user 1002 may also be re-authenticated. In the example process 1000, user device 106-1 (e.g., a smartphone) may be configured to handle the cryptographic operations to generate the authentication response.

Referring to FIG. 11, a signal flow diagram of an example method 1100 is shown, illustrating permitting SSO secure access to computing device 108 and at least one computing service 110 via continuous authentication, according to an aspect of the present disclosure. In the example shown in FIG. 11, there is no need for a separate user authentication device (e.g., a smartphone). Instead, computing device 108, such as a personal computer or smartphone, that includes a TPM or secure enclave/element may be used to securely generate and store the first authentication factor (e.g., public/private key). A second factor (e.g., a knowledge factor or a biometric factor) may then be used to protect the first authentication factor on computing device 108. The second factor may be used to activate/unlock the first factor inside the TPM, in order to use the first factor to authenticate user 1102. The second authentication factor may be entered directly on computing device 108. After authentication, computing device 108 may maintain continuous authentication with authentication server 104 via MQTT client 124 on computing device 108.

In this example, computing device 108 represents a device having secure internal storage, including a TPM or secure enclave/element that may be used to securely generate and store the first authentication factor, which may be configured to authenticate user 1102. Steps 1104-1118 relate to authenticating user 1102 to computing device 108. Although computing device 108 is described below, it is understood that, in some examples, operations between user 1102 and authentication server 104 may be performed by a similarly configured computing service 110.

At step 1104, user 1102 may declare an intent to login (access) computing device 108 (where an authentication application for system 100 is installed on computing device 108). At step 1106, computing device 108 sends a user authentication request to authentication server 104 (e.g., to OAS 112 of authentication server 104). Instead of step 1106, optionally, computing device 108 may send the authentication request to service provider 102-1 (at optional step 1106'-1) and service provider 102-1 may forward the authentication request to authentication server 104 (at optional step 1106'-2).

At step 1108, OAS 112 of authentication server 104 may send a unique authentication challenge to computing device 108. At step 1110, to unlock a first authentication factor (e.g., a private signing key), computing device 108 may prompt user 1102 to provide a second authentication factor (e.g., a knowledge or a biometric factor) directly on computing device 108, for example, via a one-click client. At step 1112, the first factor is used inside of the secure storage of computing device 108 to digitally sign the challenge from authentication server 104, and send (by computing device 108) the signed response to OAS 112 of authentication server 104.

At step 1114, authentication server 104 may forward the authentication response (and/or authentication status) to service provider 102-1. For example, OAS 112 of authentication server 104 may verify the signed response and provide an indication of the authentication status to service provider 102-1. At step 1116, service provider 102-1 may grant or deny access to computing device 108, depending on the indication of the authentication status received from authentication server 104.

Further, at step 1118, while computing device 108 is being used, computing device 108 maintains an established secure communication channel with authentication server 104 to ensure authentication server 104 that user 1102 is continuously authenticated to computing device 108.

Next, at steps 1120-1134, system 100 may authenticate user 1102 to computing service 110 (e.g., a web application, a remote device). At step 1120, user 1102 may request access on computing service 110 (e.g., a web application, a remote device) on the same computing device 108.

At step 1122, computing service 110 may send the authentication request to service provider 102-2. At step 1124, service provider 102-2 may forward the authentication request to authentication server 104 with a corresponding unique user identifier. Authentication server 104 may locate user 1102 in user database 116 via the unique user identifier. In some examples, the authentication request may be sent directly to authentication server 104 from computing service 110. In some examples, steps 1122 and 1124 may occur in cases where computing device 108 and computing service 110 belong to different service providers 102-1, 102-2.

At step 1126, authentication server 104 may determine whether user 1102 is continuously authenticated on computing device 108 (that access was requested from). When computing device 108 is continuously authenticated, step 1126 proceeds to step 1130.

When, at step 1126, authentication server 104 determines that computing device 108 is not continuously authenticated, step 1126 proceeds to step 1128, and system 100 requests re-authentication of user 1102.

At step 1130, authentication server 104 informs service provider 102-2 to grant user 1102 access to computing service 110. At step 1132, service provider 102-2 grants access to computing service 110. At step 1134, while computing service 110 is being used, computing device 108 maintains the established secure communication channel with authentication server 104 to ensure authentication server 104 that user 1102 is continuously authenticated to computing device 108.

The above process 1100 may be repeated if user 1102 wants to access another computing service 110 (or remote device) while the continuous authentication is active. User 1102 may decide to terminate the established authentication via computing device 108, by logging out from computing device 108. To regain access to computing services 110, the user needs to be re-authenticated by authentication server 104. Thus, if the continuous authentication between computing device 108 and OAS 112 of authentication server 104 is no longer maintained or user 1102 logs out from computing device 108, access to any computing service 110 on computing device 108 is terminated.

Next, several example use cases of system 100 are described. In one example, system 100 may provide a single sign-on between web services. A user may sign in to a first web service (e.g., computing service 110-1) on an electronic device (e.g., electronic device 128, user device 106, 106-1, 106-2, etc.) using authentication server 104 according to the CSSO process described herein. When the user wants to sign in to a second web service (e.g., computing service 110-2) on the same device, the user does not need to be re-authenticated. Instead, provided that the first web service is still active, that the request to sign in to the second web service happened within a pre-defined interval and that, optionally, the authentication level of the first web service meets the authentication requirements of the second web service, the user may sign on to the second web service without re-authentication.

In another example, system 100 may provide a single sign-on between a computing device (e.g., computing device 108) and one or more web services (e.g., computing service(s) 110). A user may sign into a computing device (e.g., a laptop) using authentication server 104 according to the CSSO process described herein. When the user wants to sign in to a web service on the same computing device, the user does not need to be re-authenticated. Instead, provided that the computing device is still continuously authenticated and that, optionally, the authentication level used to sign in to the computing device meets the authentication requirements of the web service the user want to access, the user may sign on to the second web service without re-authentication.

In another example, system 100 may provide a single sign-on between mobile applications (e.g., computing service(s) 110). A user may sign into a first mobile application with a mobile phone using authentication server 104 according to the CSSO process described herein. When the user wants to access a second mobile application on the same mobile phone, the user does not need to be re-authenticated. Instead, provided that the first mobile application is still active or that the request to sign in to the second mobile application happened within a pre-defined interval, and, optionally, that the authentication level of the first mobile application meets the authentication requirements of the second mobile application the user want to access, the user may sign on to the second web service without re-authentication.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

What is claimed:
1. A security system comprising:
   at least one user device, the at least one user device storing a first authentication factor associated with a user for authorized access to plural secure access services; and an authentication server communicatively coupled to the at least one user device via a network, the at least one user device comprising an authentication application configured to be installed via communication with the authentication server as part of a registration process, the authentication application configured to generate at least one cryptographic key, the at least one cryptographic key forming the first authentication factor, the authentication server configured to:
receive a first authentication request for authorized access by the user to a first secure access service among the plural secure access services; and
responsive to the first authentication request, establish a secure communication channel between the authentication server and the at least one user device, the at least one user device, responsive to the establishing of the secure communication channel, configured to:
perform an authentication of the user via the at least one user device according to a second authentication factor;
responsive to the authentication of the user, generate an authentication response to the authentication server confirming the authentication, the authentication response indicating the first authentication factor; and
transmit the authentication response to the authentication server via the secure communication channel, the authentication server granting access to the first secure access service based on the authentication response, the authentication server further configured to:
repeatedly determine whether the secure communication channel between the authentication server and the at least one user device is maintained while the user accesses the first secure access service; and
permit access to the first secure access service by the user while the secure communication channel is maintained.

2. The system of claim 1, wherein the authentication server is further configured to:
receive a second authentication request for authorized access by the user to a second secure access service among the plural secure access services;
determine whether the secure communication channel between the authentication server and the at least one user device is maintained within a predefined time limit while the user accesses the first secure access service; and
permit access to the second secure access service by the user when the secure communication channel between the authentication server and the at least one user device is maintained within the predefined time limit, without re-authenticating the user.

3. The system of claim 1, wherein the first authentication request is initiated via an out-of-bound communication protocol.

4. The system of claim 1, wherein the authentication server is configured to verify the authentication response based on a public verification key.

5. The system of claim 1, wherein the secure communication channel is established via a transport layer security (TLS) mutual authentication.

6. The system of claim 1, wherein the at least one user device and the authentication server are configured to perform a continuous authentication, responsive to the authentication server granting access to the first secure access service.

7. The system of claim 1, wherein the second authentication factor includes at least one of a knowledge component and an inherence component.

8. The system of claim 1, wherein the plural secure access services include at least one of a computing service and a computing device.

9. The system of claim 1, wherein the security system comprises a further user device.

10. The system of claim 9, wherein the authentication of the user includes performing the authentication of the user via the at least one user device according to the second authentication factor and confirming possession of the further user device, the possession determined by the at least one user device based on detection of the further user device, the authentication response confirming the authentication by the at least one user device and the possession of the further user device.

11. The system of claim 9, wherein the authentication of the user further comprises establishing a further secure communication channel between the at least one user device and the further user device, the authentication response confirming the authentication by the at least one user device and maintenance of the further secure communication channel between the first user device and the further user device.

12. The system of claim 1, wherein the authentication server periodically transmits information to at least one of the first secure access service and a service provider associated with the first secure access service indicating an authentication state of the first user device.

13. A security system comprising:
at least one user device, the at least one user device storing a first authentication factor associated with a user for authorized access to plural secure access services; and
an authentication server communicatively coupled to the at least one user device via a network;

the authentication server configured to:
receive a first authentication request for authorized access by the user to a first secure access service among the plural secure access services; and
responsive to the first authentication request, establish a secure communication channel between the authentication server and the at least one user device, the at least one user device, responsive to the establishing of the secure communication channel, configured to:
perform an authentication of the user via the at least one user device according to a second authentication factor;
responsive to the authentication of the user, generate an authentication response to the authentication server confirming the authentication, the authentication response indicating the first authentication factor; and
transmit the authentication response to the authentication server via the secure communication channel, the authentication server granting access to the first secure access service based on the authentication response, the authentication server further configured to:
repeatedly determine whether the secure communication channel between the authentication server and the at least one user device is maintained while the user accesses the first secure access service; and permit access to the first secure access service by the user while the secure communication channel is maintained, wherein, prior to the first authentication request, the security system is configured to perform a registration process to register the at least one user device of the user, the registration process comprising:

installing, by the authentication server, an authentication application on the at least one user device; and generating, by the authentication application on the at least one user device, a private signing key and a public verification key, the private signing key forming the first authentication factor, the public verification key transmitted to the authentication server and used to verify the authentication response.

14. The system of claim 13, wherein the registration process further comprises:

generating, by the authentication application on the at least one user device, a first public key and a first private key;

issuing, by the authentication server, a client certificate to the at least one user device based on the first public key, the client certificate used to establish the secure communication channel.

15. A method for providing secure access to plural access services comprising:

storing, on at least one user device, a first authentication factor associated with a user for authorized access to the plural secure access services, the at least one user device comprising an authentication application configured to be installed via communication with an authentication server as part of a registration process, the authentication application configured to generate at least one cryptographic key, the at least one cryptographic key forming the first authentication factor;

receiving, by the authentication server, a first authentication request for authorized access by the user to a first secure access service among the plural secure access services, the authentication server communicatively coupled to the at least one user device via a network;

responsive to the first authentication request, establishing, by the authentication server, a secure communication channel between the authentication server and the at least one user device, responsive to the establishing of the secure communication channel, performing, by the at least one user device, an authentication of the user via the at least one user device according to a second authentication factor;

responsive to the authentication of the user, generating, by the at least one user device, an authentication response to the authentication server confirming the authentication, the authentication response indicating the first authentication factor;

transmitting, by the at least one user device, the authentication response to the authentication server via the secure communication channel;

granting, by the authentication server, access to the first secure access service based on the authentication response;

repeatedly determining, by the authentication server, whether the secure communication channel between the authentication server and the at least one user device is maintained while the user accesses the first secure access service; and permitting, by the authentication server, access to the first secure access service by the user while the secure communication channel is maintained.

16. The method of claim 15, the method further comprising:

receiving, by the authentication server, a second authentication request for authorized access by the user to a second secure access service among the plural secure access services;

determining, by the authentication server, whether the secure communication channel between the authentication server and the at least one user device is maintained within a predefined time limit while the user accesses the first secure access service; and permitting, by the authentication server, access to the second secure access service by the user when the secure communication channel between the authentication server and the at least one user device is maintained within the predefined time limit, without re-authenticating the user.

17. The method of claim 15, wherein the authentication of the user includes:

performing the authentication of the user via the at least one user device according to the second authentication factor and confirming possession of a further user device, the possession determined by the at least one user device based on detection of the further user device, the authentication response confirming the authentication by the at least one user device and the possession of the further user device.

18. The method of claim 15, wherein the authentication of the user includes:

establishing a further secure communication channel between the at least one user device and a further user device, the authentication response confirming the authentication by the at least one user device and maintenance of the further secure communication channel between the at least one user device and the further user device.

19. A method for providing secure access to plural access services comprising:

storing, on at least one user device, a first authentication factor associated with a user for authorized access to the plural secure access services;

receiving, by an authentication server communicatively coupled to the at least one user device via a network, a first authentication request for authorized access by the user to a first secure access service among the plural secure access services;

responsive to the first authentication request, establishing, by the authentication server, a secure communication channel between the authentication server and the at least one user device, responsive to the establishing of the secure communication channel, performing, by the at least one user device, an authentication of the user via the at least one user device according to a second authentication factor;

responsive to the authentication of the user, generating, by the at least one user device, an authentication response to the authentication server confirming the authentication, the authentication response indicating the first authentication factor;

transmitting, by the at least one user device, the authentication response to the authentication server via the secure communication channel;

granting, by the authentication server, access to the first secure access service based on the authentication response;

repeatedly determining, by the authentication server, whether the secure communication channel between the authentication server and the at least one user device is maintained while the user accesses the first secure access service; and permitting, by the authentication server, access to the first secure access service by the user while the secure communication channel is maintained, the method further comprising, prior to the first authentication request, performing a registration process to register the at least one user device of the user, the registration process comprising:

installing, by the authentication server, an authentication application on the at least one user device; and generating, by the authentication application on the at least one user device, a private signing key and a public verification key, the private signing key forming the first authentication factor, the public verification key transmitted to the authentication server and used to verify the authentication response.

\* \* \* \* \*